United States Patent
Kay et al.

(10) Patent No.: US 9,731,466 B2
(45) Date of Patent: *Aug. 15, 2017

(54) SYSTEMS AND METHODS OF SUPPLYING MATERIALS TO A ROTATING FIBER PRODUCING DEVICE

(71) Applicant: CLARCOR Inc., Franklin, TN (US)

(72) Inventors: Stephen Kay, Austin, TX (US); Carlos Barocio, Tamps (MX)

(73) Assignee: CLARCOR Inc., Franklin, TN (US)

( * ) Notice: Subject to any disclaimer, the term of this patent is extended or adjusted under 35 U.S.C. 154(b) by 917 days.

This patent is subject to a terminal disclaimer.

(21) Appl. No.: 13/960,371

(22) Filed: Aug. 6, 2013

(65) Prior Publication Data

US 2014/0035178 A1    Feb. 6, 2014

Related U.S. Application Data

(60) Provisional application No. 61/680,109, filed on Aug. 6, 2012, provisional application No. 61/776,054, filed on Mar. 11, 2013.

(51) Int. Cl.
| | |
|---|---|
| B29C 47/00 | (2006.01) |
| B29D 99/00 | (2010.01) |
| D01D 5/18 | (2006.01) |
| B29C 47/12 | (2006.01) |
| B29C 47/30 | (2006.01) |
| C03B 37/04 | (2006.01) |

(52) U.S. Cl.
CPC .......... *B29D 99/0078* (2013.01); *D01D 5/18* (2013.01); *B29C 47/0014* (2013.01); *B29C 47/122* (2013.01); *B29C 47/30* (2013.01); *C03B 37/04* (2013.01); *C03B 37/045* (2013.01)

(58) Field of Classification Search
CPC .... B29D 99/0078; D01D 5/18; C03B 37/045; C03B 37/04; B29C 47/30; B29C 47/122; B29C 47/0014
See application file for complete search history.

(56) References Cited

U.S. PATENT DOCUMENTS

| | | |
|---|---|---|
| 3,622,293 A | 11/1971 | Firnhaber |
| 3,928,009 A | 12/1975 | Perry |
| 6,141,992 A | 11/2000 | Gross et al. |

FOREIGN PATENT DOCUMENTS

| | | |
|---|---|---|
| EP | 0 801 040 A2 | 10/1997 |
| WO | WO 91/13836 A1 | 9/1991 |
| WO | WO 2005/061763 A1 | 7/2005 |
| WO | WO 2007/089710 A1 | 8/2007 |

*Primary Examiner* — Robert J Grun
(74) *Attorney, Agent, or Firm* — Reinhart Boerner Van Deuren P.C.

(57) ABSTRACT

Described herein are apparatuses and methods of creating fibers, such as microfibers and nanofibers. The methods discussed herein employ centrifugal forces to transform material into fibers. Apparatuses that may be used to create fibers are also described. Use of material transfer conduits allows the continuous production of fibers without the need to stop the process to refill the fiber producing device.

19 Claims, 13 Drawing Sheets

SYSTEMS AND METHODS OF SUPPLYING MATERIALS TO A ROTATING FIBER PRODUCING DEVICE

PRIORITY CLAIM

This application claims the benefit of U.S. Provisional Application No. 61/680,109 filed on Aug. 6, 2012 and U.S. Provisional Application No. 61/776,054 filed on Mar. 11, 2013, both of which are incorporated herein by reference.

BACKGROUND OF THE INVENTION

1. Field of the Invention

The present invention generally relates to the field of fiber production. More specifically, the invention relates to fibers of micron and sub-micron size diameters.

2. Description of the Relevant Art

Fibers having small diameters (e.g., micrometer ("micron") to nanometer ("nano")) are useful in a variety of fields from the clothing industry to military applications. For example, in the biomedical field, there is a strong interest in developing structures based on nanofibers that provide scaffolding for tissue growth to effectively support living cells. In the textile field, there is a strong interest in nanofibers because the nanofibers have a high surface area per unit mass that provide light, but highly wear resistant, garments. As a class, carbon nanofibers are being used, for example, in reinforced composites, in heat management, and in reinforcement of elastomers. Many potential applications for small-diameter fibers are being developed as the ability to manufacture and control their chemical and physical properties improves.

It is well known in fiber manufacturing to produce extremely fine fibrous materials of organic fibers, such as described in U.S. Pat. Nos. 4,043,331 and 4,044,404, where a fibrillar mat product is prepared by electrostatically spinning an organic material and subsequently collecting spun fibers on a suitable surface; U.S. Pat. No. 4,266,918, where a controlled pressure is applied to a molten polymer which is emitted through an opening of an energy charged plate; and U.S. Pat. No. 4,323,525, where a water soluble polymer is fed by a series of spaced syringes into an electric field including an energy charged metal mandrel having an aluminum foil wrapper there around which may be coated with a PTFE (Teflon™) release agent. Attention is further directed to U.S. Pat. Nos. 4,044,404, 4,639,390, 4,657,743, 4,842,505, 5,522,879, 6,106,913 and 6,111,590—all of which feature polymer nanofiber production arrangements.

Electrospinning is a major manufacturing method to make nanofibers. Examples of methods and machinery used for electrospinning can be found, for example, in the following U.S. Pat. Nos. 6,616,435; 6,713,011; 7,083,854; and 7,134,857.

SUMMARY OF THE INVENTION

In some embodiments, a fiber producing system includes a body including one or more openings and a coupling member comprising an elongated conduit. The body may function to receive a material to be produced into a fiber. The material may be conveyed through the elongated conduit of the coupling member during use. The body may be couplable to a driver through the coupling member. During use, rotation of the body causes material in the body to be passed through one or more openings to produce microfibers and/or nanofibers.

In an embodiment, a microfiber and/or nanofiber producing system includes: a fiber producing device comprising a body comprising one or more openings, wherein the body is configured to receive a material to be produced into a fiber; a coupling member comprising a material delivery conduit, wherein the material is conveyed through the material delivery conduit of the coupling member into the body during use, a driver capable of rotating the fiber producing device, wherein the fiber producing device is couplable to the driver through the coupling member; and wherein, during use, rotation of the fiber producing device causes material in the body to be passed through one or more openings to produce microfibers and/or nanofibers.

In an embodiment, the material delivery conduit of the coupling member is configured to convey a pressurized fluid to the body while the fiber producing device is being rotated. This may be implemented by using a driving conduit coupled to the body of the fiber producing device, wherein the material delivery conduit is disposed within the driving conduit, and wherein the driving conduit rotates around the material delivery conduit during use. The material delivery conduit is stationary while the driving conduit is being rotated. The material delivery conduit may not be in contact with the fiber producing body. A heating device may be coupled to the material delivery conduit, wherein the heating device provides heat to the fiber producing device during use. The heating device may be positioned within the body of the fiber producing device. The heating device may be an inductive heater.

The body, in an embodiment, includes one or more sidewalls together defining an internal cavity, wherein one or more openings extend through a sidewall of the body, communicating with the internal cavity. The driver is positioned above the fiber producing device, when the fiber producing device is coupled to the driver. In some embodiments, the fiber producing device is enclosed in a chamber, and wherein the environment inside the chamber is controllable.

In another embodiment, a microfiber and/or nanofiber producing system includes: a fiber producing device comprising a body comprising one or more openings, wherein the body is configured to receive a material to be produced into a fiber; a coupling member coupled to the fiber producing device; a driver capable of rotating the fiber producing device, wherein the fiber producing device is couplable to the driver through the coupling member; and a material delivery system configured to deliver material to the body, wherein the material delivery system comprises a material delivery conduit coupled to the body and a seal formed between the material delivery conduit and the body, the seal inhibiting atmospheric gasses from entering the body; wherein, during use, rotation of the fiber producing device causes material in the body to be passed through one or more openings to produce microfibers and/or nanofibers.

The material delivery system may be a hot melt delivery system and/or a solution delivery system. The seal, in an embodiment, includes a seal body being rotatably mounted to the driver and the body, wherein during use, the driver and body rotate about the seal body.

BRIEF DESCRIPTION OF THE DRAWINGS

Advantages of the present invention will become apparent to those skilled in the art with the benefit of the following detailed description of embodiments and upon reference to the accompanying drawings.

Figure 1A:
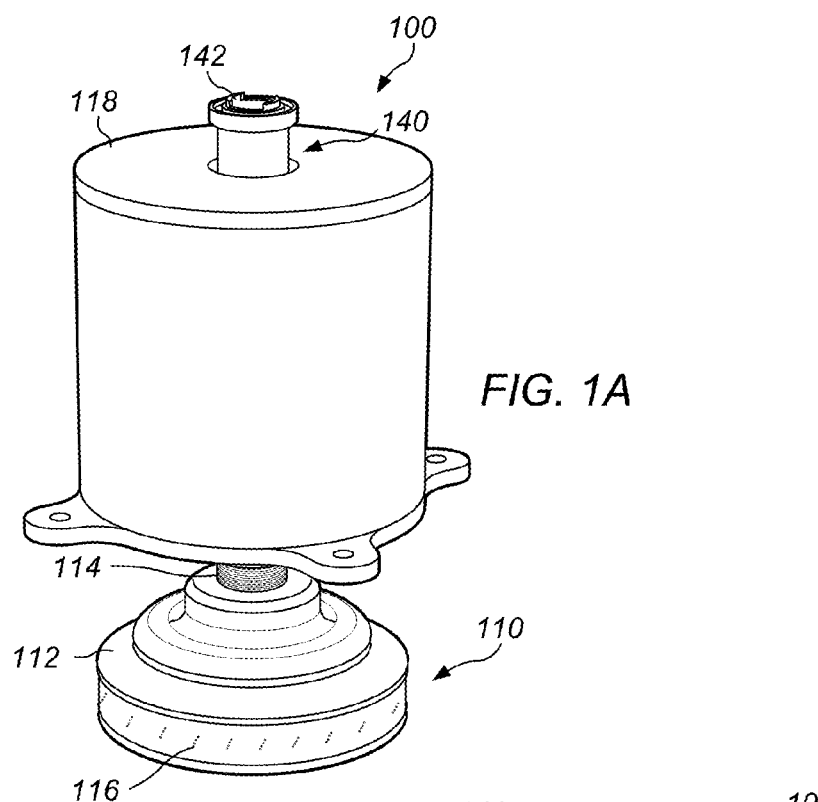
FIG. 1A depicts an embodiment of a fiber producing system with a driver mounted above the fiber producing device.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a method or apparatus that "comprises," "has," "includes" or "contains" one or more steps or elements possesses those one or more steps or elements, but is not limited to possessing only those one or more steps or elements. Likewise, an element of an apparatus that "comprises," "has," "includes" or "contains" one or more features possesses those one or more features, but is not limited to possessing only those one or more features.

Described herein are apparatuses and methods of creating fibers, such as microfibers and nanofibers. The methods discussed herein employ centrifugal forces to transform material into fibers. Apparatuses that may be used to create fibers are also described. Some details regarding creating fibers using centrifugal forces may be found in the following U.S. Published Patent Applications: 2009/0280325 entitled "Methods and Apparatuses for Making Superfine Fibers" to Lozano et al.; 2009/0269429 entitled "Superfine Fiber Creating Spinneret and Uses Thereof" to Lozano et al.; 2009/0232920 entitled "Superfine Fiber Creating Spinneret and Uses Thereof" to Lozano et al.; 2009/0280207 entitled "Superfine Fiber Creating Spinneret and Uses Thereof" to Lozano et al.; 2012/0292810 entitled "Apparatuses Having Outlet Elements and Methods for the Production of Microfibers and Nanofibers" to Peno; 2012/0294966 entitled "Multilayer Apparatuses and Methods for the Production of Microfibers and Nanofibers" to Peno et al.; 2012/0295021 entitled "Apparatuses and Methods for the Deposition of Microfibers and Nanofibers on a Substrate" to Peno et al.; 2012/0292795 to entitled "Apparatuses and Methods for Simultaneous Production of Microfibers and Nanofibers" to Peno et al.; 2012/0304613 entitled "Split Fiber Producing Devices and Methods for the Production of Microfibers and Nanofibers" to Peno et al.; and 2012/0292796 entitled "Devices and Methods for the Production of Coaxial Microfibers and Nanofibers" to Peno et al.; all of which are incorporated herein by reference.

An embodiment of a fiber producing system is depicted in FIGS. 1A-D. Fiber producing system 100 includes a fiber producing device 110. Fiber producing device 110 includes a body 112 and a coupling member 140. Body 112 comprises one or more openings 116 through which material disposed in the body may pass through during use. Fiber producing device 110 may be coupled to a driver 118 using a coupling member 140. Coupling member 140 couples fiber producing device 110 to driver 118, allowing the driver to rotate the fiber producing device during use.

In some embodiments, materials used to form fibers may conveyed into a body of a fiber producing device. In some embodiments, the material may be conveyed to the body under pressure in the form of a pressurized fluid. The material may be in the form of a solution or suspension in a suitable liquid, or the material may be in molten or melted form. Pressurized feed of materials into a fiber producing device may facilitate fiber production by forcing the materials through the openings in addition to the force provided by the spinning body of the device. A pressurized feed system may allow for produced fibers to be ejected from the openings at a higher velocity. A pressurized feed system may also allow for cleaning the fiber producing device by conveying gasses and/or solvents under pressure through the device to facilitate cleaning.

Figure 1B:
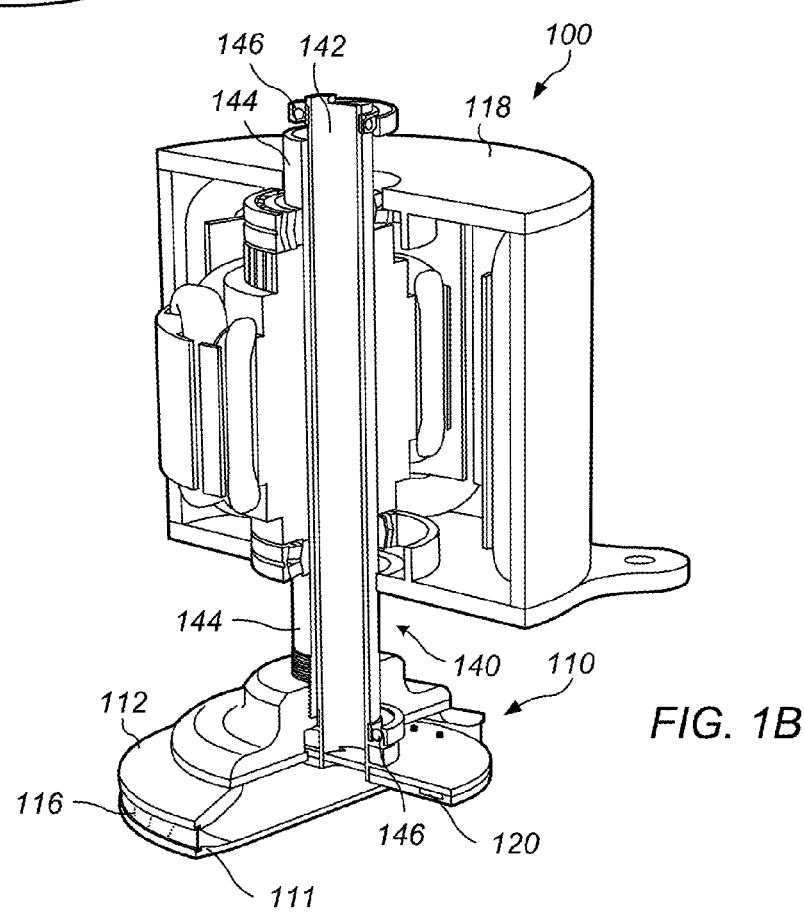
FIG. 1B depicts an embodiment of a cross section of a fiber producing system with a driver mounted above the fiber producing device.

In some embodiments, coupling member 140 includes a material delivery conduit 142 that may be used to convey materials to body 112. Material conduit 142 may convey materials through driver 118 (e.g., as depicted in FIG. 1B). Conveying materials through material delivery conduit 142 may allow the material to be delivered in an atmosphere other than air/oxygen. For example, using an inert gas to pressurize the fluid (e.g., nitrogen or argon) allows delivery of air or oxygen sensitive materials to the fiber producing device.

Coupling member 140 also includes a driving conduit 144. Driving conduit 144 is coupled to body 112 of the fiber producing device and driver 118. During use, operation of driver 118 causes driving conduit 144 to rotate which, in turn, causes fiber producing device 110 to rotate. In an embodiment, material delivery conduit 142 is disposed within driving conduit 144. During use, material delivery conduit 142 remains substantially stationary while driving conduit 144 rotates around the material delivery conduit. Coupling member 140 may include one or more bearings 146 which are positioned between driving conduit 144 and material delivery conduit 142. During use, bearings 146 provide a surface for driving conduit 144 to rotate around material delivery conduit 142. Bearings, as used herein, refers to ball, needle, or roller bearings or refers to complaint seals that position the inner conduit. Bearings 146 also create a gap between driving conduit 144 and material delivery conduit 142. This gap helps to inhibit contact of driving conduit 144 with the material delivery conduit 142. The gap also serves as an insulating space which helps maintain the temperature of any material passing through material delivery conduit 142.

The interior cavity of the body may include angled or rounded walls 111 to help direct material disposed in body 112 toward openings 116. In some embodiments, an interior cavity of body 112 may have few or no angled or rounded walls to help direct material disposed in body 112 because such angled walls are not necessary due to the material and/or the speed at which the body is spinning during the process.

Figure 1C:
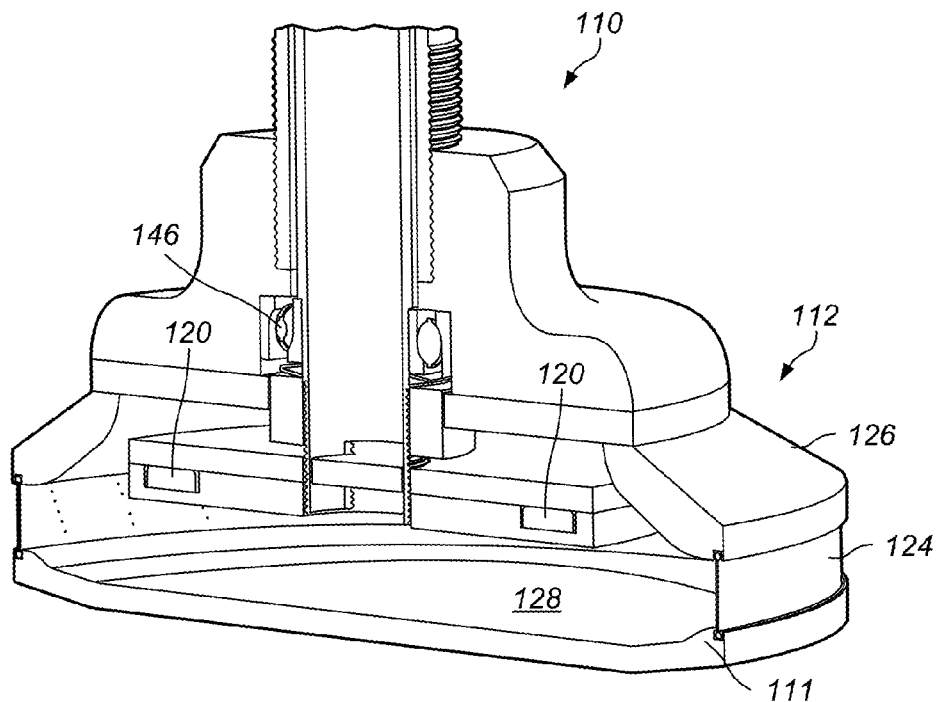
FIG. 1C depicts an embodiment of a cross section of a body of a fiber producing system.

In some embodiment, fiber producing device 110 may include internal heating device 120 (e.g., depicted in FIGS. 1B-1C). Heating device 120 may function to heat material conveyed into body 112 facilitating the production of fibers as the material is conveyed through one or more openings 116. Heating device 120 may heat material inductively or radiantly. In some embodiments, a heating device may heat material conductively, inductively or radiantly. In some embodiments, a heating device may heat material using RF, lasers, or infrared.

In some embodiments, heating device 120 maybe coupled to material delivery conduit and remain substantially motionless in relation to body 112 during use such that as body 112 spins, heating device 120 remains relatively motionless. In some embodiments, one or more wires (not shown) may be coupled to material delivery conduit to supply power to heating device 120.

In some embodiments, a driver may include a direct drive coupled to a body of a fiber producing device. A direct drive system may increase the efficiency of the fiber producing system. Direct drive mechanisms are typically devices that take the power coming from a motor without any reductions (e.g., a gearbox). In addition to increased efficiency a direct drive has other advantages including reduced noise, longer lifetime, and providing high torque a low rpm. Material delivery conduit 122 may in some embodiments convey materials through driver 118 (e.g., as depicted in FIG. 1B), in some embodiments driver 118 may include a direct driver.

Figure 1D:
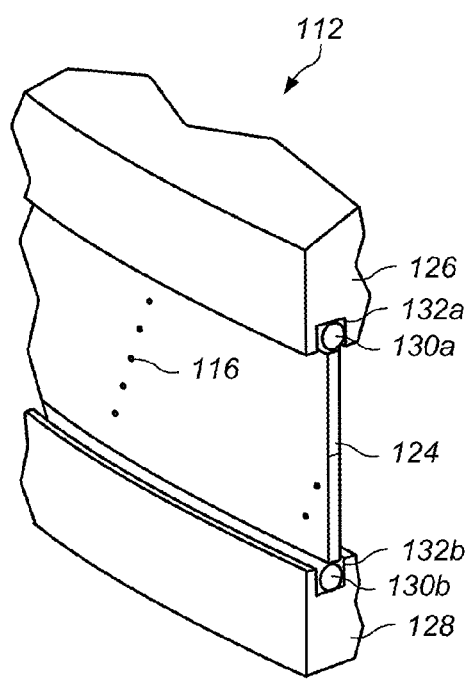
FIG. 1D depicts an embodiment of a cross section of a body of a portion of a sidewall, top member, and bottom member of a fiber producing system.

FIG. 1D depicts an embodiment of a cross section of a body 112 of a portion of a sidewall 124, top member 126, and bottom member 128 of a fiber producing system. Fiber producing system 100 includes a fiber producing device 110. Fiber producing device 110 includes a body 112 and a coupling member 140. Body 112 comprises one or more openings 116 through which material disposed in the body may pass through during use. Sidewall 124 may include a plurality of openings 116. In some embodiments, the plurality of openings may include a patterned array of openings. The patterned array may include a repeating pattern. The pattern may be such that no opening in the pattern is aligned vertically with another opening. The pattern may be such as to include a minimum distance between openings horizontally. In some embodiments, a pattern may inhibit entwining of fibers. Inhibition of fiber entwining or "roping" may result in a more consistent fiber product and better product.

Different patterns of openings may be desired and/or one or more openings may become clogged during normal use. In some embodiments, sidewall 124 of body 112 may be replaced without having to replace any other components of a fiber producing device. Sidewall 124 may be couplable to top member 126, and bottom member 128 of a fiber producing system. Edges 130*a* and 130*b* of a sidewall may fit within channels 132*a* and 132*b* of top member 126 and bottom member 128 respectively. Edges 130 may function to couple sidewall 124 to top member 126 and bottom member 128. In some embodiments, the edges of the sidewall may form a friction fit with the channels of the top and bottom members. In some embodiments, the edges of the sidewall may have a cross section similar to a cross section of the channels of the top and bottom members such that the edges may slide into the channels in a lateral direction but inhibited from being pulled out of the channels in any other direction.

Figure 2A:
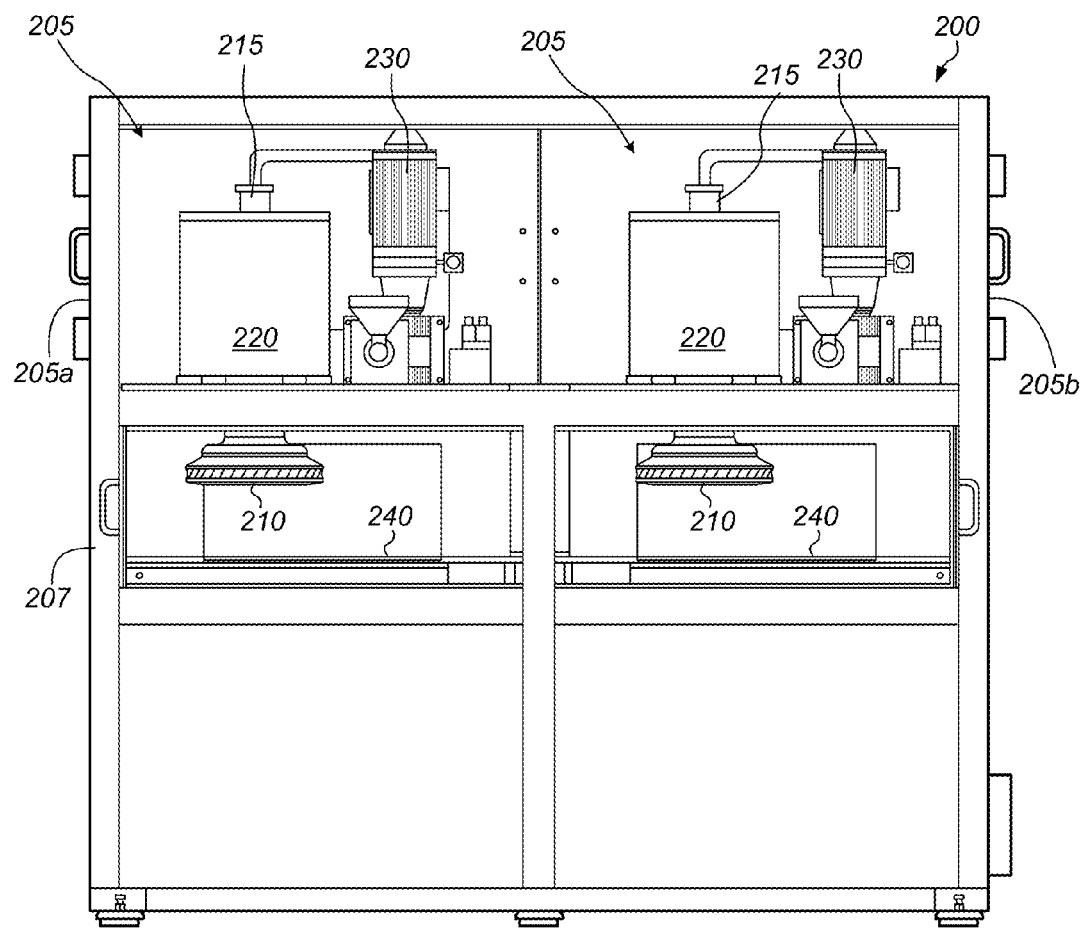
FIG. 2A depicts an embodiment of a fiber producing system.
Figure 2B:
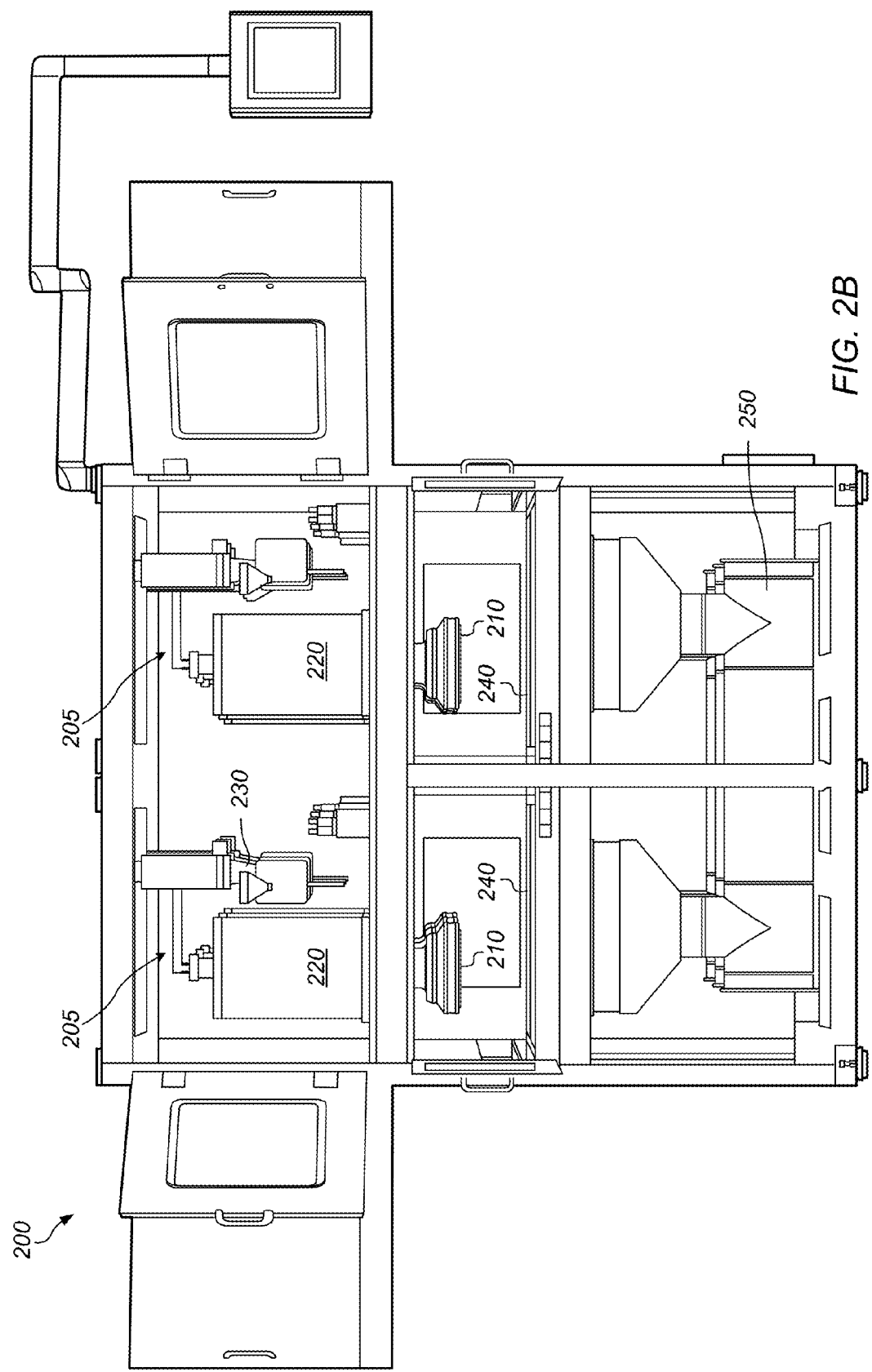
FIG. 2B depicts an embodiment of a fiber producing system opened for maintenance access.

FIGS. 2A-B depict an embodiment of a fiber producing system 200. FIG. 2B depicts an embodiment of fiber producing system 200 with access panels open for maintenance. Fiber producing system 200 includes a plurality of fiber producing modules 205 which each include a fiber producing device 210, a driver 220 and a material delivery system 230. There is theoretically no limit to the number of fiber producing modules 205 that may be coupled together in a fiber producing system 200. In some embodiments, fiber producing modules include a fiber producing system as described above in FIGS. 1A-1D. A material delivery system 230 may be coupled to the fiber producing devices 210 through coupling member 215 which extends through driver 220 as described above. In some embodiments, a fiber producing system 200 may include one or more electrostatic plates 240 which function to assist in collecting the produced fibers. A collection system may include a vacuum system 250 which pulls the produced fibers down towards a collection area.

In some embodiments, each a fiber producing module may be used to produce the same fibers, or different fibers. For example, first fiber producing module 205*a* may be used to produce different fibers (fibers having a different composition and/or size) than the fibers produced by second fiber producing module 205*b*. Each fiber producing module 205 may be adapted to be coupled to a user's personal production line. In some embodiments, the upper portion 207 of a fiber producing module may be suspended above a user's production line such that produced fibers may be applied directly to a particular user's substrate. Such a system might allow a user to incorporate fibers into their substrate production without making substantive changes to their current production facilities.

The embodiment depicted in FIGS. 2A-B may process up to about 1500 grams/minute of material (depending on the material used). The embodiment depicted may process up to 1500 milliliters of solution/minute (depending on the solvent used). Fiber producing devices 210 depicted may have a diameter of about 18 inches and include about 9000 openings for producing fibers from. In some embodiments, a fiber producing device may produce fibers with a diameter of about 100 nm to about 10+ microns, about 300 nm to about 1+ microns, or about 500 nm to about 0.8+ microns. The embodiment depicted may produce fibers with a diameter of about 300 nm to about 1+ microns. In some embodiments, a fiber producing device may produce fibers with a fiber diameter uniformity of about +/−15%, about +/−35%, or about +/−55%. Fiber diameter uniformity may be about +/−35%. In some embodiments, a fiber producing device may produce fibers with a mat lay down uniformity of about +/−5%, about +/−10%, or about +/−20%. Mat lay down uniformity may be about +/−10%.

Figure 3:
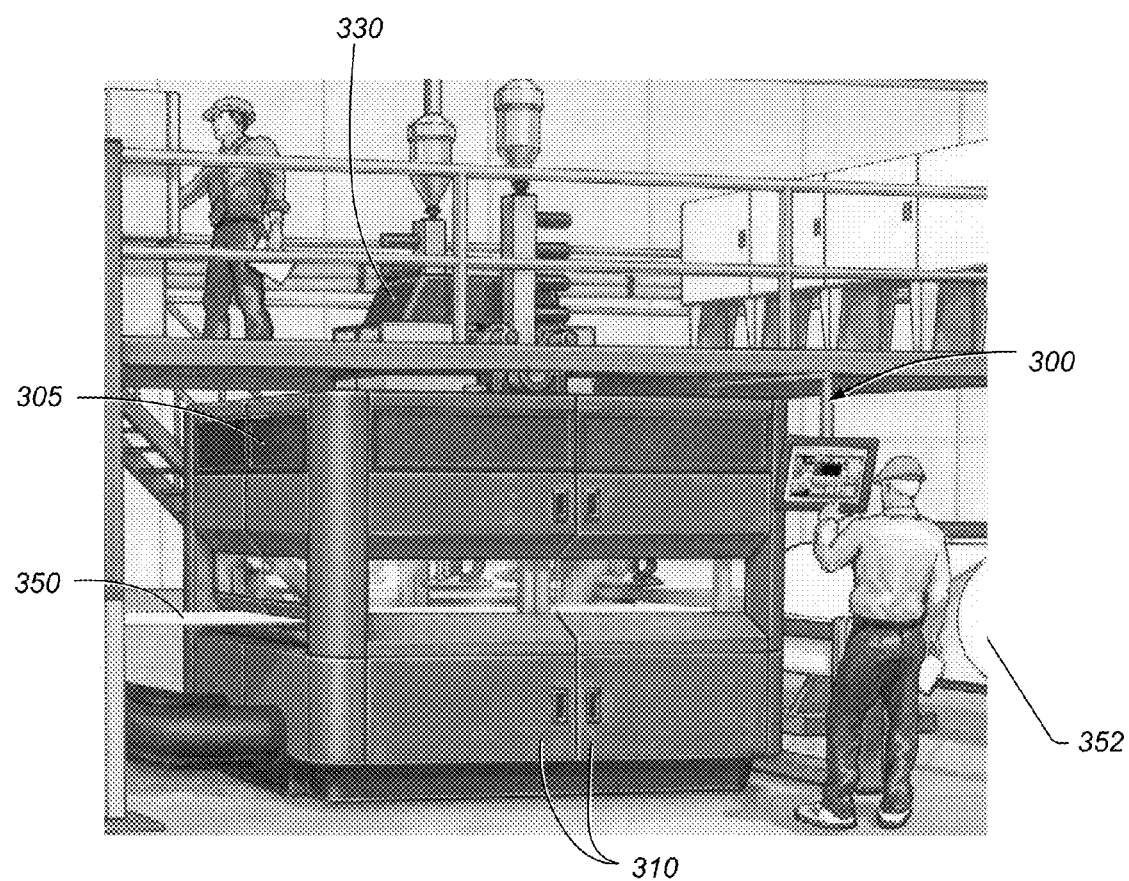
FIG. 3 depicts a perspective view of an embodiment of a modular fiber producing system.

FIG. 3 depicts an embodiment of a system 300 for producing microfibers and/or nanofibers. The system includes two or more fiber producing modules 310 coupled to each other to define a single fiber producing system 300. Fiber producing system 300 includes material transfer system 330, which may include a melt device and/or a solution device. A melt device is configured to deliver heated material to one or more of the fiber producing modules. A solution device is configured to deliver material dissolved or suspended in a liquid to one or more of the fiber producing modules. The system includes substrate transfer device 350 which transfers a substrate through coupled fiber producing modules 310. Fiber producing system 300 includes an air intake 305. Air intake may draw ambient air from the surroundings and pass the inputted air into fiber producing modules 310. In some embodiments, air intake may be coupled to an inert gas supply. Inert gas may enter the air intake and be dispersed to the fiber producing modules during processing of oxygen or air sensitive materials. Use of an inert gas may also control the humidity in the modules for water sensitive materials. In some embodiments, it is useful to maintain an elevated temperature in the fiber producing modules. To help maintain a proper operating temperature, intake gases may be heated prior to introduction into the fiber producing device. A heater (not shown) may be coupled to air intake 305 to heat gasses that enter fiber producing system 300

Figure 4:
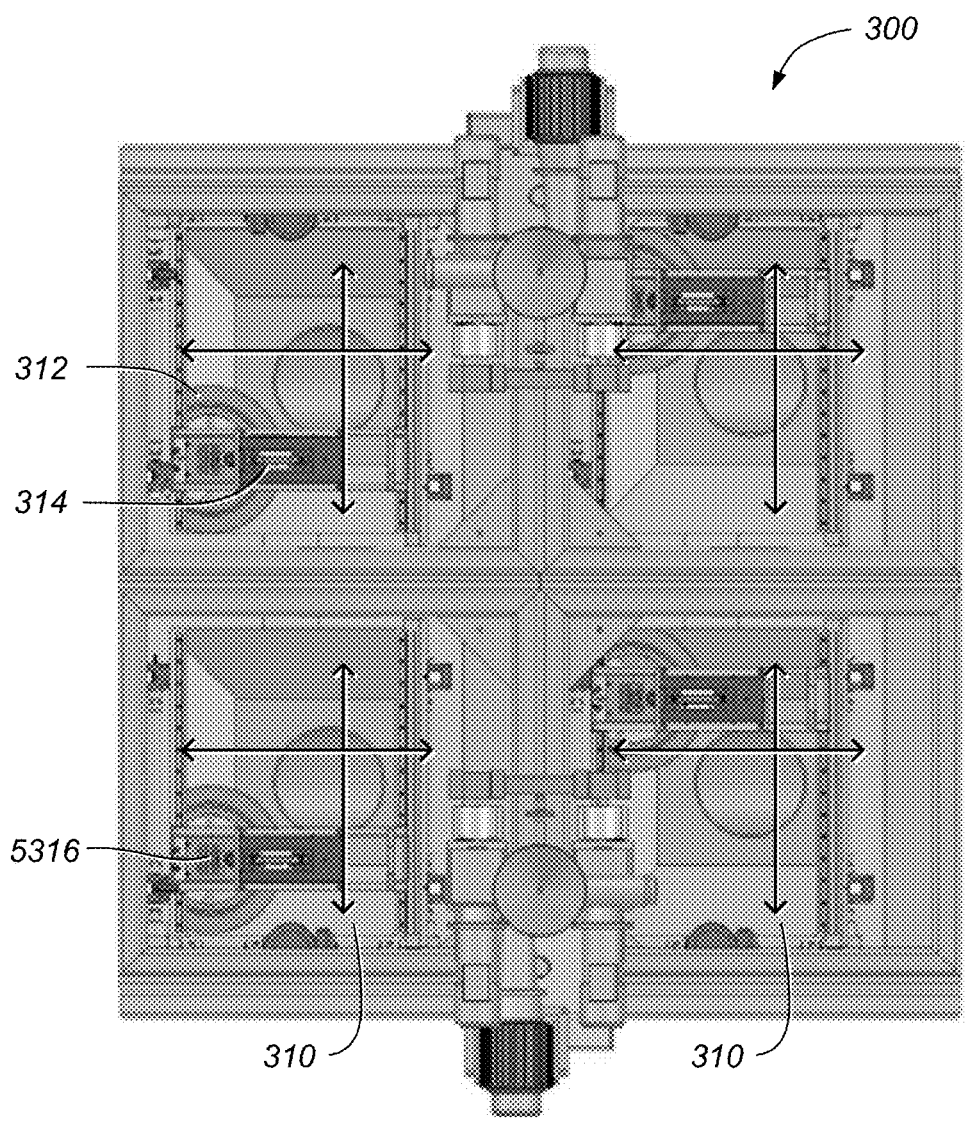
FIG. 4 depicts a top view of a modular fiber producing system.

FIG. 4 depicts a top view of fiber producing system 300. Fiber producing system 300 includes four fiber producing modules 310 coupled to each other. While only four modules are depicted, it should be understood that any number of modules may be coupled together to create customized fiber producing systems. Each module comprises a fiber producing device 312 coupled to a fiber producing device support 314. Any fiber producing device, as described herein, may be incorporated into a fiber producing module. Support 314 is movable within fiber producing module 310 such that the position of fiber producing device 312 can be adjusted within module 310. As shown, the position of fiber producing device 312 within module 310 can be adjusted along an x-y axis. Furthermore, while not depicted, fiber producing device 312 may also be adjusted along the z-axis by altering the vertical distance of the fiber producing device with respect to support 314. In some embodiments, support 314 allows up to about twenty five inch adjustability along the x-y axis and up to about ten inch adjustability along the z-axis. Support 314 may also include a driver 316 capable of rotating fiber producing device 312.

Figure 5:
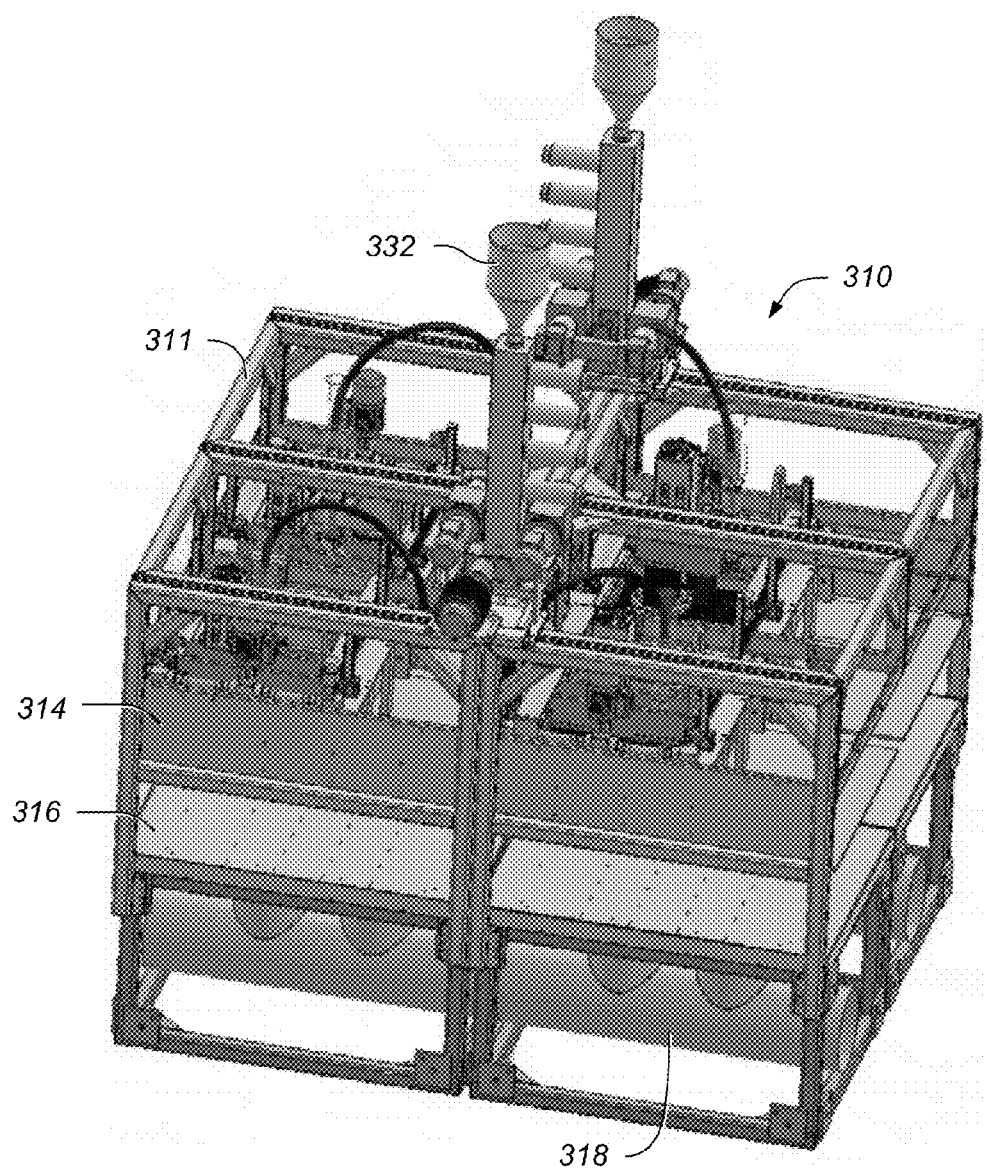
FIG. 5 depicts a cut away perspective view of a modular fiber producing system.

FIG. 5 depicts a projection view of fiber producing modules 310. Module 310 may include a fiber producing device support 314 coupled to fiber producing module body 311. Module body 311 may include rails having one or more connection devices (not shown) that allow the modules to be easily coupled to each other. Fiber producing module 310 may also include a transportation device (not shown) coupled to the module. Transportation device may allow the fiber producing device to be moved toward or away from other fiber producing modules. In an embodiment, transportation device includes one or more wheels that allow fiber producing modules to rolled away from, or toward, other fiber producing modules. Portable fiber producing modules allow users of the system to easily move and rearrange the equipment without the need for moving equipment.

Fiber producing module 310 may include a substrate platform 316. During use a substrate may be placed on the substrate platform to receive fibers produce in fiber producing module 310. In some embodiments, the substrate is transferred through fiber producing module 310 along substrate platform 316. For example, substrate may be a material that is going to be embedded with fibers. The material may be coupled to a substrate transfer system that pulls (or feeds) the substrate along substrate platform 316 of one or more fiber producing modules 310. Fiber producing module 310 may include a gas transfer conduit 318 which is used to create a flow of air away from substrate platform 316. In an embodiment, substrate platform 316 may have a plurality of holes through which air is pulled through during use. The resulting suction may help to draw fibers from the fiber producing device toward a substrate disposed on substrate platform 316. Gas transfer conduit 318 may be coupled to one or more other gas transfer conduits of other fiber producing modules.

Figure 6:
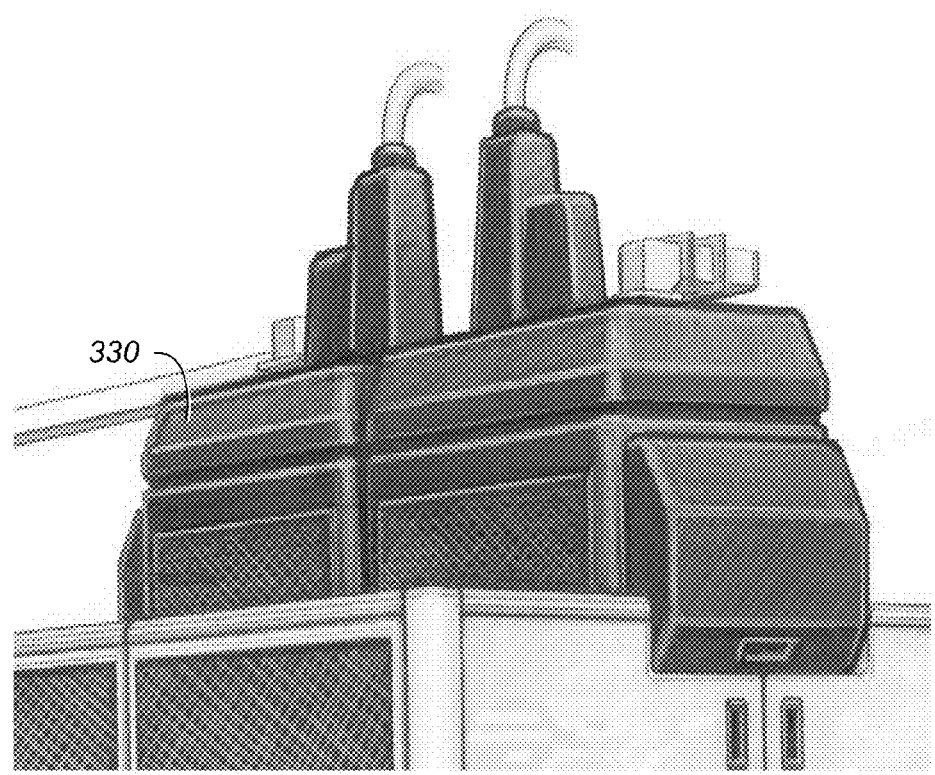
FIG. 6 depicts a perspective view of a material handling module of a fiber producing system.

FIG. 6 depicts a projection view of a material transfer device 330 coupled to multiple fiber producing modules. Each material transfer device 330 may be used to transfer material to be spun into fibers to at least one, and in some embodiments, at least two fiber producing modules. In one embodiment, material transfer device 330 may include a hot melt system. A hot melt system 332 (depicted in FIG. 7) may be used to produce a melted, or at least partially melted material, and transfer the material to the fiber producing modules in a molten, or partially molten state. In other embodiments, the material transfer device 330 may include a liquid delivery system that delivers material dissolved or suspended in a liquid to the fiber producing modules. Material transfer device 330 may include quick disconnect couplings (not shown) which allow the devices to be easily removed and replaced.

A modular fiber producing system (e.g., fiber producing system 300), may be operated using one or more controller. In one embodiment, a single main controller may be used in conjunction with multiple sub-controllers to control operation of the system. In an embodiment, each module may include a module sub-controller. A module sub-controller may activate and modulate various components within a module. For example, module sub-controller may control components such as IR sensors (for temperature measurements and fluid level measurements), heaters (e.g., heaters that heat the fiber producing device), fans (e.g., fans that direct air through the module), a positioning device (which alters the position of the fiber producing device) and door locks for the module. Material transfer devices may also have a sub-controller. The material transfer sub-controller may control aspects of operation of the material transfer sub-controller such as the heater, melt pump, pressure monitors, and temperature probes. The sub-controllers may be coupled to the main controller directly, wherein the main controller sends command signals to each of the sub-controllers to control operation of the components. In other embodiments, the module sub-controllers may be coupled to the material transfer sub-controller which in turn is coupled to the main controller. In either embodiment, main controller may control the operation of each of the components, for example by sending power on/off signals, operating parameters (such as fiber producing device rotation speed, temperature of fiber producing device, temperature of module, material temperature, material feed rate, position of the fiber producing device), and diagnostic signal checks. Main controller may also detect how many modules are present in the system, as well as the configuration of the modules. Main controller may allow independent operation of each module such that modules may be removed or added to the system without having to stop operation of modules that are operating in the system.

Figure 7:
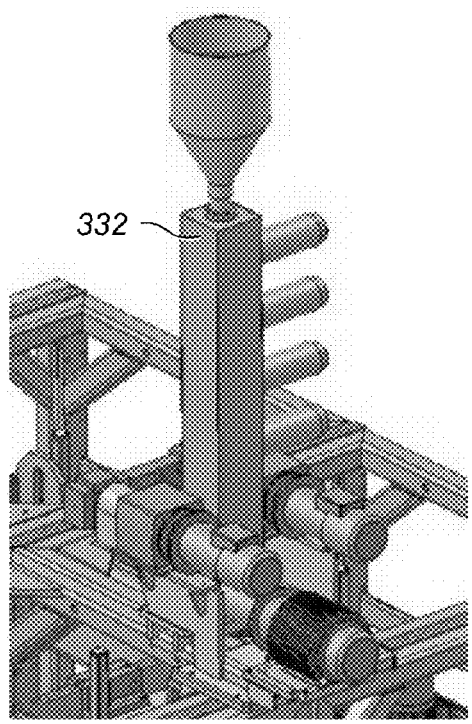
FIG. 7 depicts a perspective view of a hot melt and transfer system.
Figure 8:
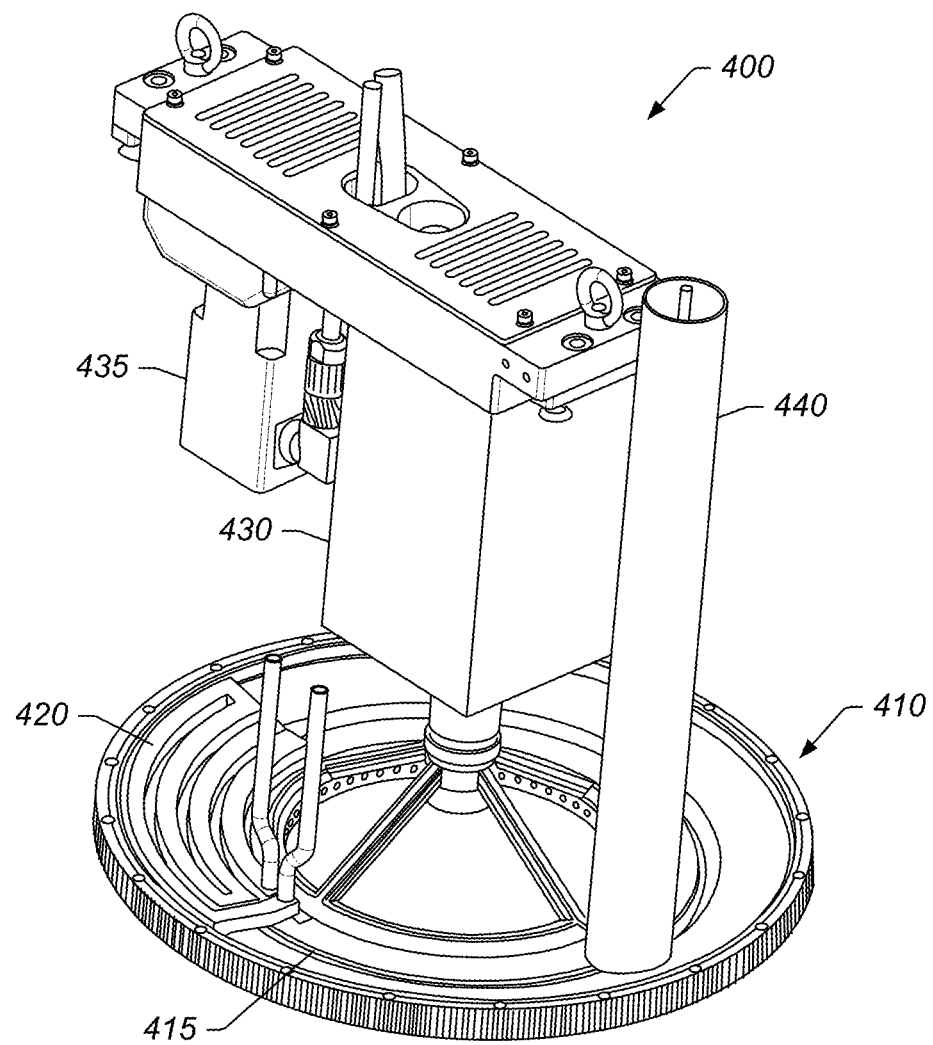
FIG. 8 depicts a perspective view of a fiber producing unit.

Another embodiment of a fiber producing device is depicted in FIG. 7. Fiber producing device 410 is part of a fiber producing unit 400 that may be disposed in a fiber producing system or module. Fiber producing unit 400, in an embodiment, includes a fiber producing device 410 comprising a body, defining a body cavity, and having a plurality of openings in the body cavity through which material is ejected during rotation of the body. An inductive heater 420 is positioned proximate to the body of fiber producing device 410 such that the inductive induces an electrical current in the body of fiber producing device 410. The body of fiber producing device thereafter becomes heated by the induced electrical current. In some embodiments, inductive heater 420 is stationary with respect to the body, while the body is being rotated.

Fiber producing unit 400 also includes a driver 430, which is capable of rotating the fiber producing body. Driver 430 is coupled to power supply 435, which supplies power to the driver and inductive heater 420.

Fiber producing device 410 includes a body cavity 415 which receives material to be used to form fibers (e.g., microfibers and nanofibers). A material transfer conduit 440 may be used to transfer material to the body cavity. Material transfer conduit 440 may transfer liquids to the fiber producing device (e.g., liquid suspensions, liquid solutions, and hot materials). In one embodiment, material transfer conduit 440 may be coupled to a hot melt system (e.g., material transfer device 330) and may be insulated to allow the transfer of heated material to the fiber producing device without substantial reduction in temperature of the material. For example, material transfer conduit 440 may be a hot runner conduit. Fiber producing device 410 includes a plurality of openings through which material is ejected to produce microfibers and/or nanofibers.

Figure 9:
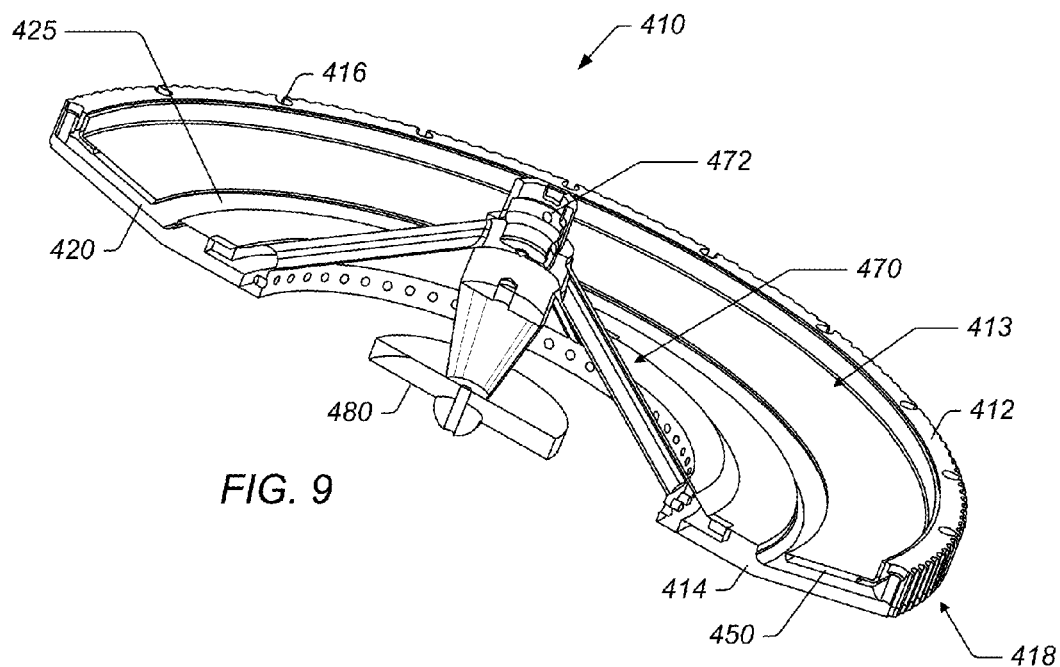
FIG. 9 depicts a perspective view of a fiber producing device of the fiber producing system of FIG. 8.

FIG. 9 depicts a cross-section view of a fiber producing device 410. Fiber producing device 410 includes a gear like body 418, having a plurality of orifices disposed in the groove of each gear like extension. Body 418 may be composed of a top member 412 and a bottom member 414. Top member 412 may be coupled to bottom member 414 using fasteners placed in recessed holes 416. Fasteners may be removable to allow the top member to be separated from the bottom member to allow cleaning of the fiber producing device. Top member 412 and bottom member 414 together define body cavity 415, in which the material to be formed into fibers is disposed. An opening 425 (e.g., in the form of a channel) extends through top member 412 to body cavity 420 to allow material to be placed into body cavity. Use of a channel that couples directly to the body cavity allows introduction of the material from the top face of the body while the body is being rotated.

Figure 11:
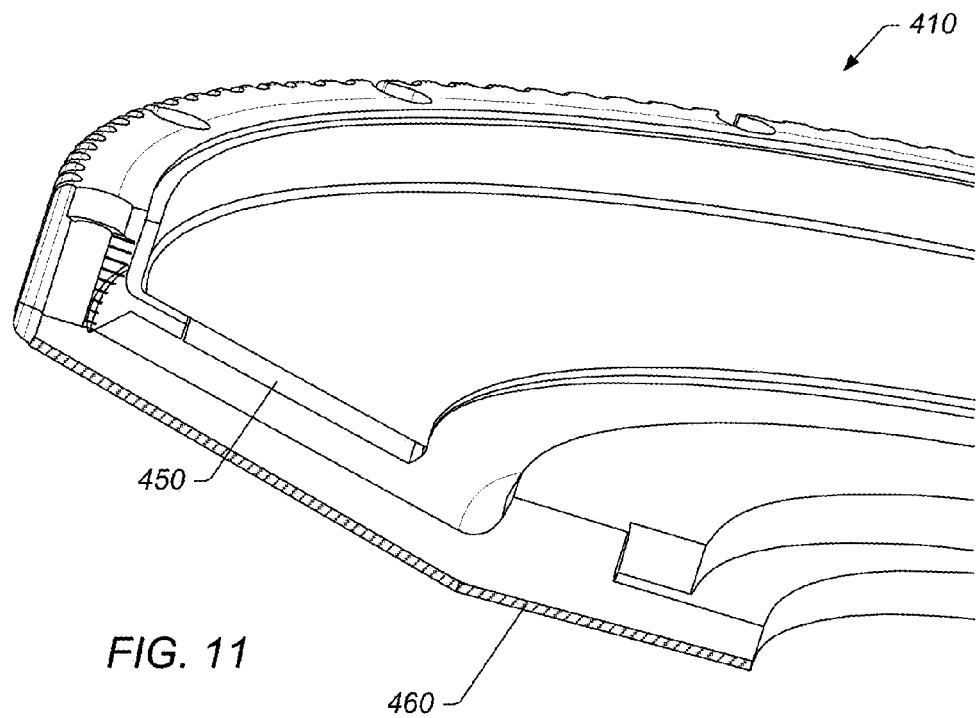
FIG. 11 depicts an expanded cross-section view of the body of a fiber producing device of the fiber producing system of FIG. 8.

In some embodiments, a shield 450 is disposed on top member 412. FIG. 11 is an expanded cross sectional view of the fiber producing device 410. Shield 450 is positioned such that the shield at least partially surrounds inductive heater coil 420, positioned proximate to the fiber producing device during use. Shield 450, in one embodiment, is shaped to cover the bottom of an inductive heating coil and the outer perimeter of the coil. Shield 450 may be formed from any material that is inductive frequency transparent and capable of withstanding the high temperature used, for example, during melt processing. An example of a shield material is TenCate Ultra high temp RS-55 resin. Other polymeric material may be used. Shield 450 is rapidly heated by the fiber producing device and serves as a barrier to inhibit material from collecting and accumulating on the cooler inductive coil. In an embodiment an insulating layer 460, depicted in FIG. 6, is disposed on a bottom exterior surface of the fiber producing device. Insulating layer 460 reduces heat loss from the body of the fiber producing device (when heated) and improves thermal uniformity of the material disposed within the body cavity.

Figure 10:
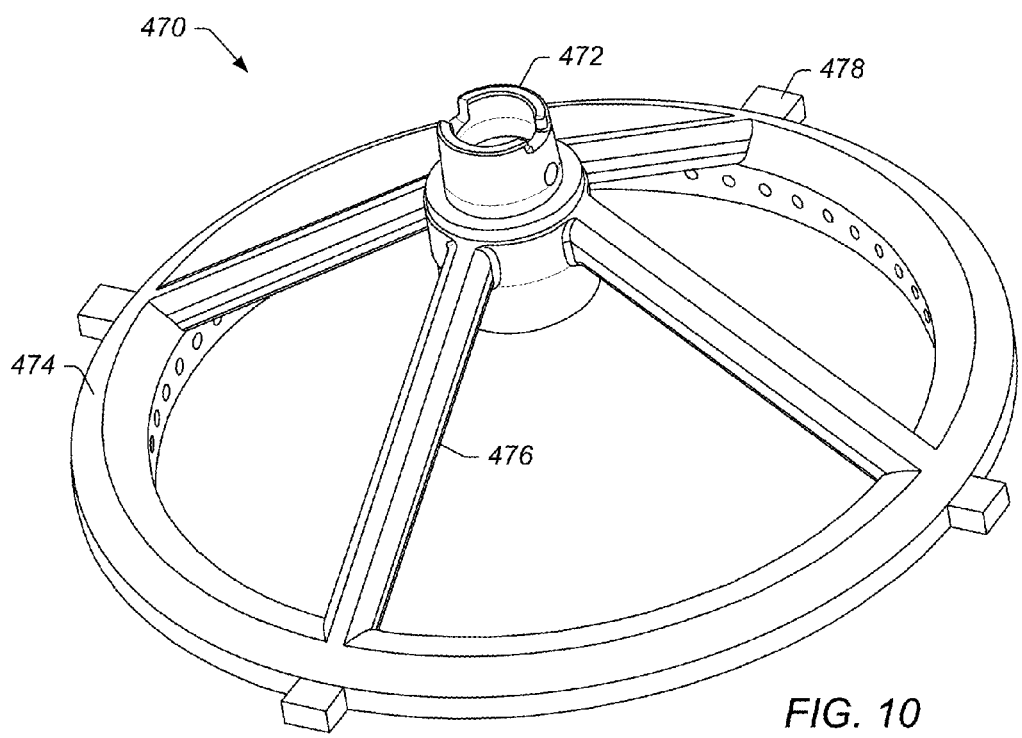
FIG. 10 depicts a perspective view of a coupling member of a fiber producing device of the fiber producing system of FIG. 8.

Fiber producing device 410 is coupled to a drive using coupling member 470. An embodiment of coupling member 470 is depicted in FIG. 10. Coupling member, in some embodiments, has an open hub design. An open hub design features a central coupler 472 which is connected to a coupling ring 474 through one or more arms 476, leaving a substantially empty area between the central coupler and the coupling ring. Coupling ring 474 may include one or more coupling tabs 478, which interlock with corresponding features on fiber producing device body 410 to removably couple the coupling member to the fiber producing body, as depicted in FIG. 9. This open hub design helps improve air flow management around the fiber producing device.

In some embodiments, it is desirable to control the flow of fibers being produced from the fiber producing device. For example, it may be desirable to direct fibers toward a substrate disposed below the fiber producing device. In some embodiment, a fan 480 may be coupled to the coupling member, as depicted in FIG. 9. Fan 480 may create a flow of gas in a downward direction, away from the fiber producing device when the fiber producing device is rotated. In some embodiments, fan 480 is removably coupled to coupling member such that the fan may be changed to accommodate the processing parameters of the system.

Figure 12:
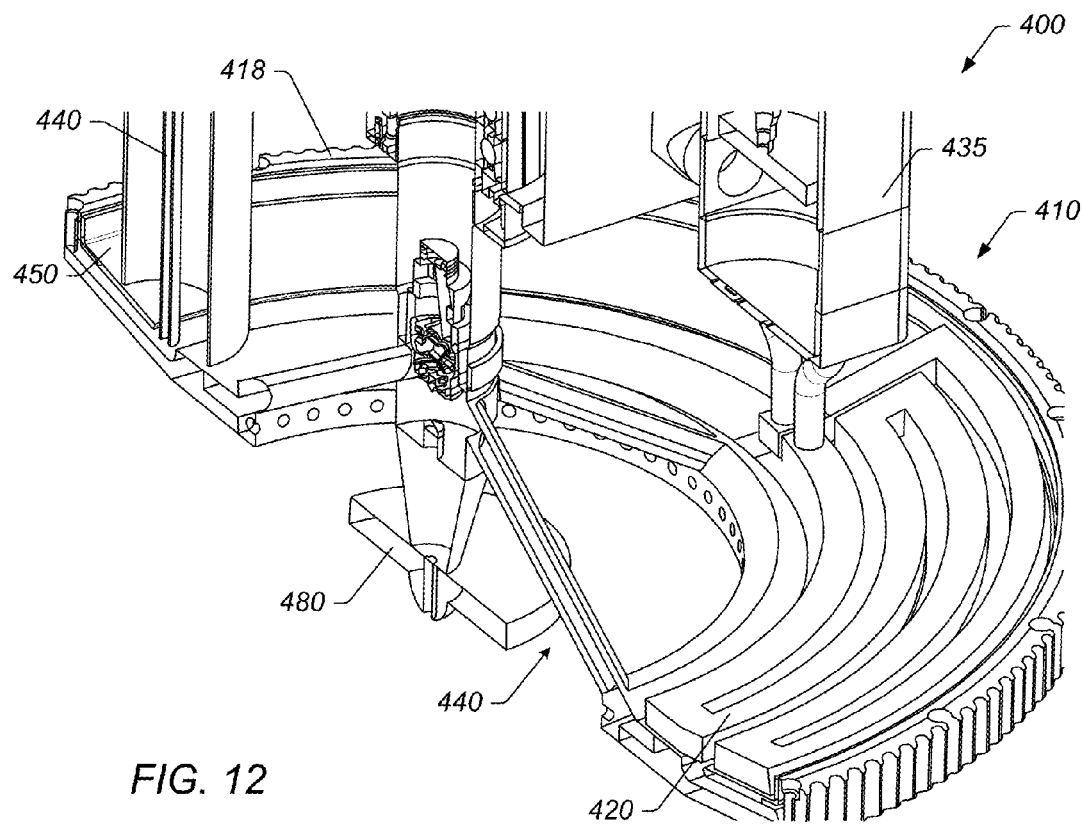
FIG. 12 depicts a cross-section view of the fiber producing system of FIG. 8.

FIG. 12 depicts a cross-sectional view of an assembled fiber producing unit 400. The fiber producing unit includes a fiber producing device 410, which includes body 418, coupling member 470 and fan 480. Fiber producing unit 400 also includes inductive heating coil 420, power supply 435 for the inductive heating coil, and a material transfer conduit 440. Material transfer conduit is coupled to a material transfer device (not shown) which supplies material to the fiber producing device.

Figure 13:
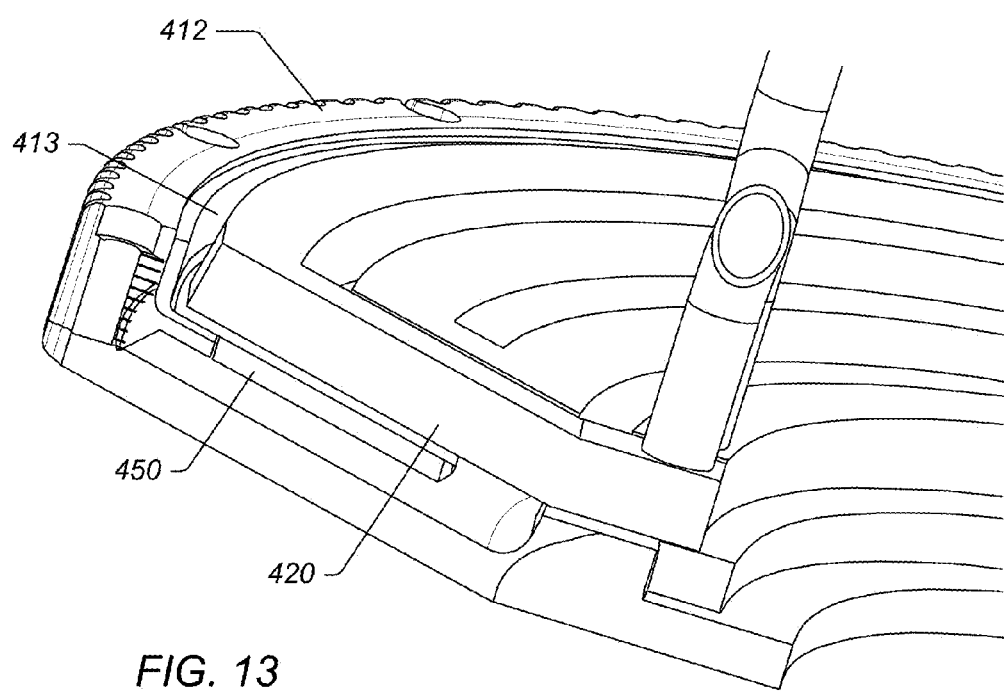
FIG. 13 depicts an expanded cross-section view of the body of a fiber producing device, with a proximate inductive heating coil.

FIG. 13 depicts an expanded view of fiber producing unit 400 of FIG. 60. Inductive heating coil 420, in one embodiment is positioned within the confines of a channel 413 defined along the upper surface of top member 412 of the body. As discussed above, a shield 450 is an inductive frequency transparent and serves as barrier that inhibits the deposition of material onto inductive heating coil 420. Channel 413, better seen in FIG. 9, has a shape that is complementary to the outer shape of inductive heating coil 420. When assembled, inductive heating coil 420 fits within channel 413 without touching any surface of the channel. Inductive coil 420 is at least partially encompassed by channel 413. During use, inductive heating coil 420 is disposed, at least partially, within channel 413 in a stationary position with respect to the fiber producing device body. Thus, when rotated, fiber producing device 410 spins about the inductive heating coil 420 without contacting the inductive heating coil. Channel 413 allows the inductive heating coil to be placed proximate to the fiber producing device body to induce a current in the body, creating heat.

An inductive heating system heats the fiber producing body, which is formed from a material to which energy can be coupled either electrically or magnetically from the inductive coil (e.g., a ferritic or martensitic stainless steel) by electromagnetic induction. Electromagnetic induction creates eddy currents (also called Foucault currents) within the fiber producing device body. Resistance of the fiber producing body to the induced current leads to Joule heating of the metal. If the fiber producing device body is made of a ferromagnetic material, magnetic hysteresis may be used to inductively heat the body by using a magnetic field. Each time a ferromagnetic material is exposed to a magnetic field whose amplitude and/or direction varies cyclically in time a small amount of energy is dissipated as heat due to magnetic hysteresis effects. The more rapidly the field is cycled, the greater the rate at which heat is produced by the material.

The inductive heating system includes an inductive heating coil 420, through which a high-frequency alternating current (AC) is passed. The amount of heat generated in the fiber producing body is controlled by varying the inductive current induced in the fiber producing device body. In some embodiments, the shape or material used to form the fiber producing body may be adjusted to modify the induced current flow through the body. The shape of the body may therefore produce a homogenous distribution of current through the body to produce more homogenous heating of the body.

Figure 14:
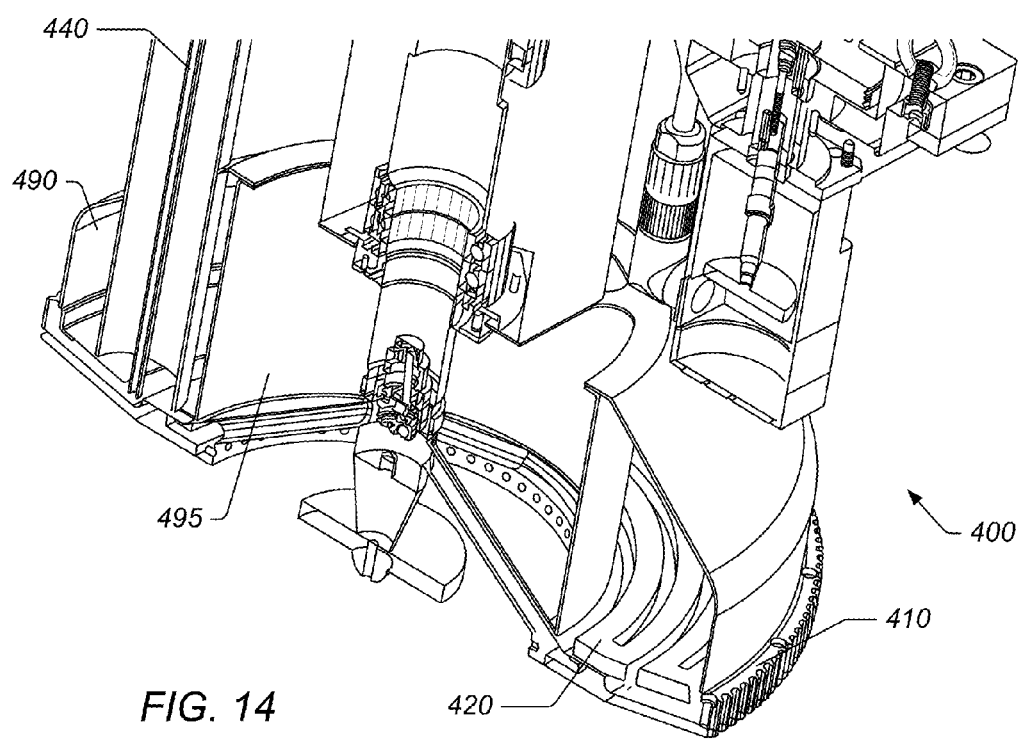
FIG. 14 depicts a cross-section view of a sealed fiber producing unit.

FIG. 14 depicts an embodiment of a sealed fiber producing unit 400. Sealed fiber producing unit includes a fiber producing device 410, inductive heater 420, and material transfer conduit 440, as well as other components as previously described. Sealed fiber producing device further includes sealing members 490 and 495 which form a seal which inhibits atmospheric gasses from entering the body cavity of the fiber producing device. Seal may include cut-out portions that allow inductive heater 420 and material transfer conduit 440 access to the fiber producing device. In some embodiments, seal is not necessarily "air-tight". In such a system, the material in the fiber producing body may be protected from atmospheric gasses by creating a positive pressure of inert gas within the sealed region defined by the sealing members. Inert gases include, but are not limited to gases such as nitrogen, helium and argon. The sealing members also help to inhibit heat loss from the fiber producing unit components. For example, the presence of sealing members may inhibit cooling of the fiber producing device due to heat transfer through atmospheric gasses.

Figure 15:
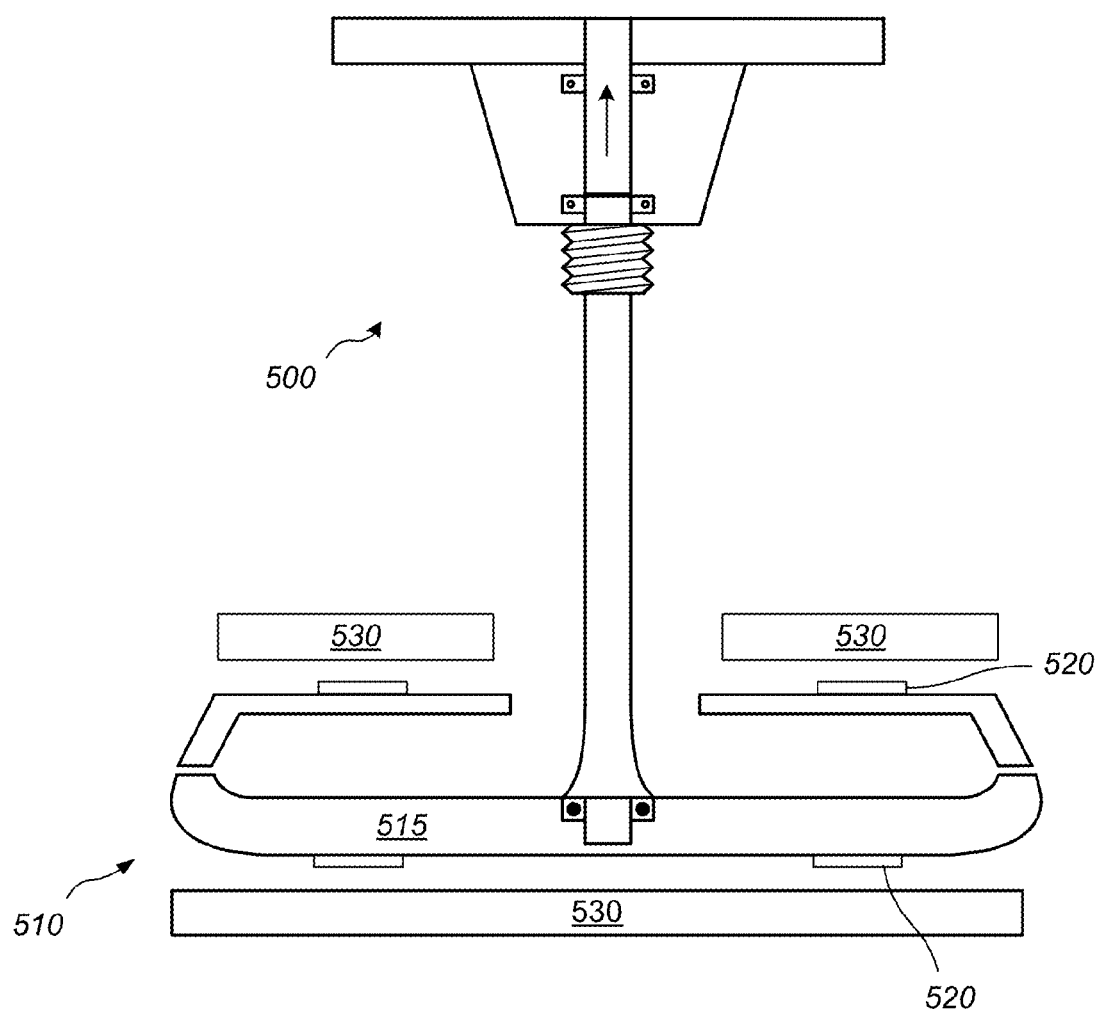
FIG. 15 depicts a schematic diagram of a fiber producing system having a magnetic induction system.

FIG. 15 depicts a schematic diagram of a fiber producing system having a magnetic induction system. Fiber producing system 500 may include a fiber producing device 510 which may be magnetically heated. Magnetic heating system includes oppositely polarized magnets 520 positioned on a surface of a fiber producing device body 515, and one or more permanent magnets 530 magnetically coupled to the permanent magnets. During rotation of the fiber producing device, a current is induced in the body by the interaction of the polarized magnets positioned on the fiber producing device with the permanent magnets.

Fibers represent a class of materials that are continuous filaments or that are in discrete elongated pieces, similar to lengths of thread. Fibers are of great importance in the biology of both plants and animals, e.g., for holding tissues together. Human uses for fibers are diverse. For example, fibers may be spun into filaments, thread, string, or rope. Fibers may also be used as a component of composite materials. Fibers may also be matted into sheets to make products such as paper or felt. Fibers are often used in the manufacture of other materials.

Fibers as discussed herein may be created using, for example, a solution spinning method or a melt spinning method. In both the melt and solution spinning methods, a material may be put into a fiber producing device which is spun at various speeds until fibers of appropriate dimensions are made. The material may be formed, for example, by melting a solute or may be a solution formed by dissolving a mixture of a solute and a solvent. Any solution or melt familiar to those of ordinary skill in the art may be employed. For solution spinning, a material may be designed to achieve a desired viscosity, or a surfactant may be added to improve flow, or a plasticizer may be added to soften a rigid fiber. In melt spinning, solid particles may comprise, for example, a metal or a polymer, wherein polymer additives may be combined with the latter. Certain materials may be added for alloying purposes (e.g., metals) or adding value (such as antioxidant or colorant properties) to the desired fibers.

Non-limiting examples of reagents that may be melted, or dissolved or combined with a solvent to form a material for melt or solution spinning methods include polyolefin, polyacetal, polyamide, polyester, cellulose ether and ester (e.g., cellulose acetate, cellulose diacetate, cellulose triacetate, etc.), polyalkylene sulfide, polyarylene oxide, polysulfone, modified polysulfone polymers and mixtures thereof. Non-limiting examples of solvents that may be used include oils, lipids and organic solvents such as DMSO, toluene and alcohols. Water, such as de-ionized water, may also be used as a solvent. For safety purposes, non-flammable solvents are preferred.

In either the solution or melt spinning method, as the material is ejected from the spinning fiber producing device, thin jets of the material are simultaneously stretched and dried or stretched and cooled in the surrounding environment. Interactions between the material and the environment at a high strain rate (due to stretching) leads to solidification of the material into fibers, which may be accompanied by evaporation of solvent. By manipulating the temperature and strain rate, the viscosity of the material may be controlled to manipulate the size and morphology of the fibers that are created. A wide variety of fibers may be created using the present methods, including novel fibers such as polypropylene (PP) nanofibers. Non-limiting examples of fibers made using the melt spinning method include polypropylene, acrylonitrile butadiene styrene (ABS) and nylon. Non-limiting examples of fibers made using the solution spinning method include polyethylene oxide (PEO) and beta-lactams.

The creation of fibers may be done in batch modes or in continuous modes. In the latter case, material can fed continuously into the fiber producing device and the process can be continued over days (e.g., 1-7 days) and even weeks (e.g., 1-4 weeks).

The methods discussed herein may be used to create, for example, nanocomposites and functionally graded materials that can be used for fields as diverse as, for example, drug delivery and ultrafiltration (such as electrets). Metallic and ceramic nanofibers, for example, may be manufactured by controlling various parameters, such as material selection and temperature. At a minimum, the methods and apparatuses discussed herein may find application in any industry that utilizes micro- to nano-sized fibers and/or micro- to nano-sized composites. Such industries include, but are not limited to, material engineering, mechanical engineering, military/defense industries, biotechnology, medical devices, tissue engineering industries, food engineering, drug delivery, electrical industries, or in ultrafiltration and/or microelectric mechanical systems (MEMS).

Some embodiments of a fiber producing device may be used for melt and/or solution processes. Some embodiments of a fiber producing device may be used for making organic and/or inorganic fibers. With appropriate manipulation of the environment and process, it is possible to form fibers of various configurations, such as continuous, discontinuous, mat, random fibers, unidirectional fibers, woven and non-woven, as well as fiber shapes, such as circular, elliptical and rectangular (e.g., ribbon). Other shapes are also possible. The produced fibers may be single lumen or multi-lumen.

By controlling the process parameters, fibers can be made in micron, sub-micron and nano-sizes, and combinations thereof. In general, the fibers created will have a relatively narrow distribution of fiber diameters. Some variation in diameter and cross-sectional configuration may occur along the length of individual fibers and between fibers.

Generally speaking, a fiber producing device helps control various properties of the fibers, such as the cross-sectional shape and diameter size of the fibers. More particularly, the speed and temperature of a fiber producing device, as well as the cross-sectional shape, diameter size and angle of the outlets in a fiber producing device, all may help control the cross-sectional shape and diameter size of the fibers. Lengths of fibers produced may also be influenced by the choice of fiber producing device used.

The temperature of the fiber producing device may influence fiber properties, in certain embodiments. Both resistance and inductance heaters may be used as heat sources to heat a fiber producing device. In certain embodiments, the fiber producing device is thermally coupled to a heat source that may be used to adjust the temperature of the fiber producing device before spinning, during spinning, or both before spinning and during spinning. In some embodiments, the fiber producing device is cooled. For example, a fiber producing device may be thermally coupled to a cooling source that can be used to adjust the temperature of the fiber producing device before spinning, during spinning, or before and during spinning Temperatures of a fiber producing device may range widely. For example, a fiber producing device may be cooled to as low as −20 C or heated to as high as 2500 C. Temperatures below and above these exemplary values are also possible. In certain embodiments, the temperature of a fiber producing device before and/or during spinning is between about 4° C. and about 400° C. The temperature of a fiber producing device may be measured by using, for example, an infrared thermometer or a thermocouple.

The speed at which a fiber producing device is spun may also influence fiber properties. The speed of the fiber producing device may be fixed while the fiber producing device is spinning, or may be adjusted while the fiber producing device is spinning Those fiber producing devices whose speed may be adjusted may, in certain embodiments, be characterized as variable speed fiber producing devices. In the methods described herein, the fiber producing device may be spun at a speed of about 500 RPM to about 25,000 RPM, or any range derivable therein. In certain embodiments, the fiber producing device is spun at a speed of no more than about 50,000 RPM, about 45,000 RPM, about 40,000 RPM, about 35,000 RPM, about 30,000 RPM, about 25,000 RPM, about 20,000 RPM, about 15,000 RPM, about 10,000 RPM, about 5,000 RPM, or about 1,000 RPM. In certain embodiments, the fiber producing device is rotated at a rate of about 5,000 RPM to about 25,000 RPM.

In an embodiment, a method of creating fibers, such as microfibers and/or nanofibers, includes: heating a material; placing the material in a heated fiber producing device; and, after placing the heated material in the heated fiber producing device, rotating the fiber producing device to eject material to create nanofibers from the material. In some embodiments, the fibers may be microfibers and/or nanofibers. A heated fiber producing device is a structure that has a temperature that is greater than ambient temperature. "Heating a material" is defined as raising the temperature of that material to a temperature above ambient temperature. "Melting a material" is defined herein as raising the temperature of the material to a temperature greater than the melting point of the material, or, for polymeric materials, raising the temperature above the glass transition temperature for the polymeric material. In alternate embodiments, the fiber producing device is not heated. Indeed, for any embodiment that employs a fiber producing device that may be heated, the fiber producing device may be used without heating. In some embodiments, the fiber producing device is heated but the material is not heated. The material becomes heated once placed in contact with the heated fiber producing device. In some embodiments, the material is heated and the fiber producing device is not heated. The fiber producing device becomes heated once it comes into contact with the heated material.

A wide range of volumes/amounts of material may be used to produce fibers. In addition, a wide range of rotation times may also be employed. For example, in certain embodiments, at least 5 milliliters (mL) of material are positioned in a fiber producing device, and the fiber producing device is rotated for at least about 10 seconds. As discussed above, the rotation may be at a rate of about 500 RPM to about 25,000 RPM, for example. The amount of material may range from mL to liters (L), or any range derivable therein. For example, in certain embodiments, at least about 50 mL to about 100 mL of the material are positioned in the fiber producing device, and the fiber producing device is rotated at a rate of about 500 RPM to about 25,000 RPM for about 300 seconds to about 2,000 seconds. In certain embodiments, at least about 5 mL to about 100 mL of the material are positioned in the fiber producing device, and the fiber producing device is rotated at a rate of 500 RPM to about 25,000 RPM for 10-500 seconds. In certain embodiments, at least 100 mL to about 1,000 mL of material is positioned in the fiber producing device, and the fiber producing device is rotated at a rate of 500 RPM to about 25,000 RPM for about 100 seconds to about 5,000 seconds. Other combinations of amounts of material, RPMs and seconds are contemplated as well.

Fibers may also be formed using a continuous process. For example, a fiber producing device may hold between about 50 mL to about 1000 mL of material. As the material is spun into a fiber, additional material may be added to the fiber producing device using material transfer conduits, as described herein, to maintain a predefined amount of material in the fiber producing device. IN this manner continuous processing of fibers may be achieved.

Typical dimensions for fiber producing devices are in the range of several inches in diameter and in height. In some embodiments, a fiber producing device has a diameter of between about 1 inch to about 60 inches, from about 2 inches to about 30 inches, or from about 5 inches to about 25 inches. The height of the fiber producing device may range from about 1 inch to about 10 inches, from about 2 inches to about 8 inches, or from about 3 inches to about 5 inches.

In certain embodiments, fiber producing device includes at least one opening and the material is extruded through the opening to create the nanofibers. In certain embodiments, the fiber producing device includes multiple openings and the material is extruded through the multiple openings to create the nanofibers. These openings may be of a variety of shapes (e.g., circular, elliptical, rectangular, square) and of a variety of diameter sizes (e.g., 0.01-0.80 mm). When multiple openings are employed, not every opening need be identical to another opening, but in certain embodiments, every opening is of the same configuration. Some opens may include a divider that divides the material, as the material passes through the openings. The divided material may form multi-lumen fibers.

In an embodiment, material may be positioned in a reservoir of a fiber producing device. The reservoir may, for example, be defined by a concave cavity of the heated structure. In certain embodiments, the heated structure includes one or more openings in communication with the concave cavity. The fibers are extruded through the opening while the fiber producing device is rotated about a spin axis. The one or more openings have an opening axis that is not parallel with the spin axis. The fiber producing device may include a body that includes the concave cavity and a lid positioned above the body.

Another fiber producing device variable includes the material(s) used to make the fiber producing device. Fiber producing devices may be made of a variety of materials, including metals (e.g., brass, aluminum, stainless steel) and/or polymers. The choice of material depends on, for example, the temperature the material is to be heated to, or whether sterile conditions are desired.

Any method described herein may further comprise collecting at least some of the microfibers and/or nanofibers that are created. As used herein "collecting" of fibers refers to fibers coming to rest against a fiber collection device. After the fibers are collected, the fibers may be removed from a fiber collection device by a human or robot. A variety of methods and fiber (e.g., nanofiber) collection devices may be used to collect fibers.

Regarding the fibers that are collected, in certain embodiments, at least some of the fibers that are collected are continuous, discontinuous, mat, woven, nonwoven or a mixture of these configurations. In some embodiments, the fibers are not bundled into a cone shape after their creation. In some embodiments, the fibers are not bundled into a cone shape during their creation. In particular embodiments, fibers are not shaped into a particular configuration, such as a cone figuration, using gas, such as ambient air, that is blown onto the fibers as they are created and/or after they are created.

Present method may further comprise, for example, introducing a gas through an inlet in a housing, where the housing surrounds at least the heated structure. The gas may be, for example, nitrogen, helium, argon, or oxygen. A mixture of gases may be employed, in certain embodiments.

The environment in which the fibers are created may comprise a variety of conditions. For example, any fiber discussed herein may be created in a sterile environment. As used herein, the term "sterile environment" refers to an environment where greater than 99% of living germs and/or microorganisms have been removed. In certain embodiments, "sterile environment" refers to an environment substantially free of living germs and/or microorganisms. The fiber may be created, for example, in a vacuum. For example the pressure inside a fiber producing system may be less than ambient pressure. In some embodiments, the pressure inside a fiber producing system may range from about 1 millimeters (mm) of mercury (Hg) to about 700 mm Hg. In other embodiments, the pressure inside a fiber producing system may be at or about ambient pressure. In other embodiments, the pressure inside a fiber producing system may be greater than ambient pressure. For example the pressure inside a fiber producing system may range from about 800 mm Hg to about 4 atmospheres (atm) of pressure, or any range derivable therein.

In certain embodiments, the fiber is created in an environment of 0-100% humidity, or any range derivable therein. The temperature of the environment in which the fiber is created may vary widely. In certain embodiments, the temperature of the environment in which the fiber is created can be adjusted before operation (e.g., before rotating) using a heat source and/or a cooling source. Moreover, the temperature of the environment in which the fiber is created may be adjusted during operation using a heat source and/or a cooling source. The temperature of the environment may be set at sub-freezing temperatures, such as −20° C., or lower. The temperature of the environment may be as high as, for example, 2500° C.

The material employed may include one or more components. The material may be of a single phase (e.g., solid or liquid) or a mixture of phases (e.g., solid particles in a liquid). In some embodiments, the material includes a solid and the material is heated. The material may become a liquid upon heating. In another embodiment, the material may be mixed with a solvent. As used herein a "solvent" is a liquid that at least partially dissolves the material. Examples of solvents include, but are not limited to, water and organic solvents. Examples of organic solvents include, but are not limited to: hexanes, ether, ethyl acetate, acetone, dichloromethane, chloroform, toluene, xylenes, petroleum ether, dimethylsulfoxide, dimethylformamide, or mixtures thereof. Additives may also be present. Examples of additives include, but are not limited to: thinners, surfactants, plasticizers, or combinations thereof.

The material used to form the fibers may include at least one polymer. Polymers that may be used include conjugated polymers, biopolymers, water soluble polymers, and particle infused polymers. Examples of polymers that may be used include, but are not limited to polypropylenes, polyethylenes, polyolefins, polystyrenes, polyesters, fluorinated polymers (fluoropolymers), polyamides, polyaramids, acrylonitrile butadiene styrene, nylons, polycarbonates, beta-lactams, block copolymers or any combination thereof. The polymer may be a synthetic (man-made) polymer or a natural polymer. The material used to form the fibers may be a composite of different polymers or a composite of a medicinal agent combined with a polymeric carrier. Specific polymers that may be used include, but are not limited to chitosan, nylon, nylon-6, polybutylene terephthalate (PBT), polyacrylonitrile (PAN), poly(lactic acid) (PLA), poly(lactic-co-glycolic acid) (PLGA), polyglycolic acid (PGA), polyglactin, polycaprolactone (PCL), silk, collagen, poly (methyl methacrylate) (PMMA), polydioxanone, polyphenylene sulfide (PPS); polyethylene terephthalate (PET), polytetrafluoroethylene (PTFE), polyvinylidene fluoride (PVDF), polypropylene (PP), polyethylene oxide (PEO), acrylonitrile butadiene, styrene (ABS), and polyvinylpyrrolidone (PVP). These polymers may be processed as either a melt or as a solution in a suitable solvent.

In another embodiment, the material used to form the fibers may be a metal, ceramic, or carbon-based material. Metals employed in fiber creation include, but are not limited to, bismuth, tin, zinc, silver, gold, nickel, aluminum, or combinations thereof. The material used to form the fibers may be a ceramic such as alumina, titania, silica, zirconia, or combinations thereof. The material used to form the fibers may be a composite of different metals (e.g., an alloy such as nitonol), a metal/ceramic composite or a ceramic oxide (e.g., PVP with germanium/palladium/platinum).

The fibers that are created may be, for example, one micron or longer in length. For example, created fibers may be of lengths that range from about 1 µm to about 50 cm, from about 100 µm to about 10 cm, or from about 1 mm to about 1 cm. In some embodiments, the fibers may have a narrow length distribution. For example, the length of the fibers may be between about 1 µm to about 9 µm, between about 1 mm to about 9 mm, or between about 1 cm to about 9 cm. In some embodiments, when continuous methods are performed, fibers of up to about 10 meters, up to about 5 meters, or up to about 1 meter in length may be formed.

In certain embodiments, the cross-section of the fiber may be circular, elliptical or rectangular. Other shapes are also possible. The fiber may be a single-lumen fiber or a multi-lumen fiber.

In another embodiment of a method of creating a fiber, the method includes: spinning material to create the fiber; where, as the fiber is being created, the fiber is not subjected to an externally-applied electric field or an externally-applied gas; and the fiber does not fall into a liquid after being created.

Fibers discussed herein are a class of materials that exhibit an aspect ratio of at least 100 or higher. The term "microfiber" refers to fibers that have a minimum diameter in the range of 10 microns to 700 nanometers, or from 5 microns to 800 nanometers, or from 1 micron to 700 nanometers. The term "nanofiber" refers to fibers that have a minimum diameter in the range of 500 nanometers to 1 nanometer; or from 250 nanometers to 10 nanometers, or from 100 nanometers to 20 nanometers.

While typical cross-sections of the fibers are circular or elliptic in nature, they can be formed in other shapes by controlling the shape and size of the openings in a fiber producing device (described below). Fibers may include a blending of multiple materials. Fibers may also include holes (e.g., lumen or multi-lumen) or pores. Multi-lumen fibers may be achieved by, for example, designing one or more exit openings to possess concentric openings. In certain embodiments, such openings may include split openings (that is, wherein two or more openings are adjacent to each other; or, stated another way, an opening possesses one or more dividers such that two or more smaller openings are made). Such features may be utilized to attain specific physical properties, such as thermal insulation or impact absorbance (resilience). Nanotubes may also be created using methods and apparatuses discussed herein.

Fibers may be analyzed via any means known to those of skill in the art. For example, Scanning Electron Microscopy (SEM) may be used to measure dimensions of a given fiber. For physical and material characterizations, techniques such as differential scanning calorimetry (DSC), thermal analysis (TA) and chromatography may be used.

In particular embodiments, a fiber of the present fibers is not a lyocell fiber. Lyocell fibers are described in the literature, such as in U.S. Pat. Nos. 6,221,487, 6,235,392, 6,511,930, 6,596,033 and 7,067,444, each of which is incorporated herein by reference.

In one embodiment, microfibers and nanofibers may be produced substantially simultaneously. Any fiber producing device described herein may be modified such that one or more openings has a diameter and/or shape that produces nanofibers during use, and one or more openings have a diameter and/or shape that produces microfibers during use. Thus, a fiber producing device, when rotated will eject material to produce both microfibers and nanofibers. In some embodiments, nozzles may be coupled to one or more of the openings. Different nozzles may be coupled to different openings such that the nozzles designed to create microfibers and nozzles designed to create nanofibers are coupled to the openings. In an alternate embodiment, needles may be coupled (either directly to the openings or via a needle port). Different needles may be coupled to different openings such that needles designed to create microfibers and needles designed to create nanofibers are coupled to the openings. Production of microfibers and nanofibers substantially simultaneously may allow a controlled distribution of the fiber size to be achieved, allowing substantial control of the properties of products ultimately produced from the microfiber/nanofiber mixture.

After production of fibers is completed, it is desirable to clean the fiber producing device to allow reuse of the system. Generally, it is easiest to clean a fiber producing device when the material is in a liquid state. Once the material reverts to a solid, cleaning may be difficult, especially cleaning up small diameter nozzles and or needles coupled to the fiber producing device. The difficulty, especially with melt spinning, is that cleanup may also be difficult when the device is at an elevated temperature, especially if the fiber producing device needs to be cooled prior to handling for clean up. In some embodiments, a purge system may be couplable to fiber producing device when the fiber producing device is heated. A purge system may provide an at least partial seal between the purge system and the body of a fiber producing device such that a gas may be directed into the body, through the purge system, to create a pressurized gas inside of the body. The purge system, in some embodiments, includes a sealing member couplable to the body, a pressurized gas source, and a conduit coupling the pressurized gas source to the sealing member.

Microfibers and nanofibers produced using any of the devices and methods described herein may be used in a variety of applications. Some general fields of use include, but are not limited to: food, materials, electrical, defense, tissue engineering, biotechnology, medical devices, energy, alternative energy (e.g., solar, wind, nuclear, and hydroelectric energy); therapeutic medicine, drug delivery (e.g., drug solubility improvement, drug encapsulation, etc.); textiles/fabrics, nonwoven materials, filtration (e.g., air, water, fuel, semiconductor, biomedical, etc); automotive; sports; aeronautics; space; energy transmission; papers; substrates; hygiene; cosmetics; construction; apparel, packaging, geotextiles, thermal and acoustic insulation.

Some products that may be formed using microfibers and/or nanofibers include but are not limited to: filters using charged nanofiber and/or microfiber polymers to clean fluids; catalytic filters using ceramic nanofibers ("NF"); carbon nanotube ("CNT") infused nanofibers for energy storage; CNT infused/coated NF for electromagnetic shielding; mixed micro and NF for filters and other applications; polyester infused into cotton for denim and other textiles; metallic nanoparticles or other antimicrobial materials infused onto/coated on NF for filters; wound dressings, cell growth substrates or scaffolds; battery separators; charged polymers or other materials for solar energy; NF for use in environmental clean-up; piezoelectric fibers; sutures; chemical sensors; textiles/fabrics that are water & stain resistant, odor resistant, insulating, self-cleaning, penetration resistant, anti-microbial, porous/breathing, tear resistant, and wear resistant; force energy absorbing for personal body protection armor; construction reinforcement materials (e.g., concrete and plastics); carbon fibers; fibers used to toughen outer skins for aerospace applications; tissue engineering substrates utilizing aligned or random fibers; tissue engineering Petri dishes with aligned or random nanofibers; filters used in pharmaceutical manufacturing; filters combining microfiber and nanofiber elements for deep filter functionality; hydrophobic materials such as textiles; selectively absorbent materials such as oil booms; continuous length nanofibers (aspect ratio of more than 1,000 to 1); paints/stains; building products that enhance durability, fire resistance, color retention, porosity, flexibility, anti microbial, bug resistant, air tightness; adhesives; tapes; epoxies; glues; adsorptive materials; diaper media; mattress covers; acoustic materials; and liquid, gas, chemical, or air filters.

Fibers may be coated after formation. In one embodiment, microfibers and/or nanofibers may be coated with a polymeric or metal coating. Polymeric coatings may be formed by spray coating the produced fibers, or any other method known for forming polymeric coatings. Metal coatings may be formed using a metal deposition process (e.g., CVD).

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A microfiber and/or nanofiber producing system comprising:
    a fiber producing device comprising a body comprising one or more openings, wherein the body is configured to receive a material to be produced into a fiber;
    a coupling member comprising a material delivery conduit, wherein the material is conveyed through the material delivery conduit of the coupling member into the body during use,
    a driver capable of rotating the fiber producing device, wherein the fiber producing device is couplable to the driver through the coupling member; and
    wherein, during use, rotation of the fiber producing device causes material in the body to be passed through one or more openings to produce microfibers and/or nanofibers; and
    wherein the coupling member further comprises a driving conduit coupled to the body of the fiber producing device, wherein the material delivery conduit is disposed within the driving conduit, and wherein the driving conduit rotates around the material delivery conduit during use.

2. The system of claim 1, wherein the material delivery conduit is stationary while the driving conduit is being rotated.

3. The system of claim 1, wherein the driver comprises a direct drive device.

4. The system of claim 1, wherein the body comprises one or more sidewalls together defining an internal cavity, wherein one or more openings extend through a sidewall of the body, communicating with the internal cavity.

5. A method of producing microfibers and/or nanofibers, comprising:
    placing material in the fiber producing device of claim 1 by sending the material through the material delivery conduit into the body of the fiber producing device;
    rotating the fiber producing device, wherein rotation of the fiber producing device causes material in the body to be passed through one or more openings to produce microfibers and/or nanofibers; and
    collecting at least a portion of the produced microfibers and/or nanofibers.

6. The method of claim 5, wherein the material is placed in the fiber producing device as a pressurized fluid while the fiber producing device is being rotated.

7. The method of claim 5, further comprising:
    heating the material to a temperature sufficient to at least partially melt the material;
    heating the fiber producing device to a temperature at or near the temperature sufficient to at least partially melt the material; and
    conveying the heated material through the material delivery conduit into the heated fiber producing device.

8. The method of claim 5, further comprising:
    placing material in a fiber producing device via the material delivery conduit; and
    heating the fiber producing device to a temperature at or near the temperature sufficient to at least partially melt the material disposed in the fiber producing device.

9. The method of claim 5, further comprising mixing the material with a solvent to produce a mixture of the material in a solvent, and conveying the mixture through the material delivery conduit into the fiber producing device.

10. A microfiber and/or nanofiber producing system comprising:
    a fiber producing device comprising a body comprising one or more openings, wherein the body is configured to receive a material to be produced into a fiber;

a coupling member comprising a material delivery conduit, wherein the material is conveyed through the material delivery conduit of the coupling member into the body during use, a driver capable of rotating the fiber producing device, wherein the fiber producing device is couplable to the driver through the coupling member; and wherein, during use, rotation of the fiber producing device causes material in the body to be passed through one or more openings to produce microfibers and/or nanofibers; and wherein the material delivery conduit of the coupling member is configured to convey a pressurized fluid to the body while the fiber producing device is being rotated.

11. A microfiber and/or nanofiber producing system comprising:

a fiber producing device comprising a body comprising one or more openings, wherein the body is configured to receive a material to be produced into a fiber;

a coupling member comprising a material delivery conduit, wherein the material is conveyed through the material delivery conduit of the coupling member into the body during use, a driver capable of rotating the fiber producing device, wherein the fiber producing device is couplable to the driver through the coupling member;

wherein, during use, rotation of the fiber producing device causes material in the body to be passed through one or more openings to produce microfibers and/or nanofibers; and wherein the material delivery conduit is not in contact with the fiber producing body.

12. A microfiber and/or nanofiber producing system comprising:

a fiber producing device comprising a body comprising one or more openings, wherein the body is configured to receive a material to be produced into a fiber;

a coupling member comprising a material delivery conduit, wherein the material is conveyed through the material delivery conduit of the coupling member into the body during use, a driver capable of rotating the fiber producing device, wherein the fiber producing device is couplable to the driver through the coupling member;

wherein, during use, rotation of the fiber producing device causes material in the body to be passed through one or more openings to produce microfibers and/or nanofibers; and wherein a heating device is coupled to the material delivery conduit, wherein the heating device provides heat to the fiber producing device during use.

13. The system of claim 12, wherein the heating device is positioned within the body of the fiber producing device.

14. The system of claim 12, wherein the heating device is an inductive heater.

15. A microfiber and/or nanofiber producing system comprising:

a fiber producing device comprising a body comprising one or more openings, wherein the body is configured to receive a material to be produced into a fiber;

a coupling member coupled to the fiber producing device;

a driver capable of rotating the fiber producing device, wherein the fiber producing device is couplable to the driver through the coupling member; and a material delivery system configured to deliver material to the body, wherein the material delivery system comprises a material delivery conduit coupled to the body and a seal formed between the material delivery conduit and the body, the seal inhibiting atmospheric gasses from entering the body;

wherein, during use, rotation of the fiber producing device causes material in the body to be passed through one or more openings to produce microfibers and/or nanofibers.

16. The system of claim 15, wherein the material delivery system is a hot melt delivery system.

17. The system of claim 15, wherein the material delivery system is a solution delivery system.

18. The system of claim 15, wherein the seal comprises a seal body being rotatably mounted to the driver and the body, wherein during use, the driver and body rotate about the seal body.

19. The system of claim 15, wherein the material delivery conduit of the coupling member is configured to convey a pressurized fluid to the body while the fiber producing device is being rotated.

* * * * *